United States Patent
Kotani et al.

(10) Patent No.: US 12,410,847 B2
(45) Date of Patent: Sep. 9, 2025

(54) SHOCK ABSORBER

(71) Applicant: Hitachi Astemo, Ltd., Ibaraki (JP)

(72) Inventors: Takamasa Kotani, Hitachinaka (JP);
Kentaro Yamada, Hitachinaka (JP);
Mikio Yamashita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 400 days.

(21) Appl. No.: 18/017,861

(22) PCT Filed: Jul. 14, 2021

(86) PCT No.: PCT/JP2021/026439
§ 371 (c)(1),
(2) Date: Jan. 25, 2023

(87) PCT Pub. No.: WO2022/024759
PCT Pub. Date: Feb. 3, 2022

(65) Prior Publication Data
US 2023/0272835 A1   Aug. 31, 2023

(30) Foreign Application Priority Data
Jul. 29, 2020  (JP) ................................. 2020-128095

(51) Int. Cl.
*F16F 9/512*  (2006.01)
*F16F 9/18*   (2006.01)
(Continued)

(52) U.S. Cl.
CPC ............. *F16F 9/341* (2013.01); *F16F 9/185* (2013.01); *F16F 9/348* (2013.01); *F16F 9/512* (2013.01);
(Continued)

(58) Field of Classification Search
CPC ................................... F16F 9/34; F16F 9/341
See application file for complete search history.

(56) References Cited

U.S. PATENT DOCUMENTS

| | | | |
|---|---|---|---|
| 2011/0290603 A1 | 12/2011 | Yabe | |
| 2015/0210136 A1* | 7/2015 | Teraoka | F16F 9/3487 188/282.1 |

(Continued)

FOREIGN PATENT DOCUMENTS

| | | |
|---|---|---|
| JP | 2-41666 B2 | 9/1990 |
| JP | 2012-67880 A | 4/2012 |

(Continued)

OTHER PUBLICATIONS

International Search Report received in corresponding International Application No. PCT/JP2021/026439 dated Sep. 7, 2021.

(Continued)

*Primary Examiner* — Robert A. Siconolfi
(74) *Attorney, Agent, or Firm* — MATTINGLY & MALUR, PC

(57) ABSTRACT

This shock absorber includes a first damping force generation mechanism provided in a passage of a piston, and a second damping force generation mechanism provided in a piston rod. The second damping force generation mechanism includes a valve seat member, a sub-valve provided in the valve seat member, and a cap member covering one end side of the second damping force generation mechanism and at least a part of an outer circumference of the valve seat member. A communication passage is formed on one end side of the cap member. A biasing member provided so that one end surface side is in contact with an outer circumferential side of the cap member with respect to the commu- (Continued)

nication passage, and a bendable flexible disc provided so that the other end surface side of the biasing member is in contact therewith.

6 Claims, 11 Drawing Sheets

(51) Int. Cl.
*F16F 9/34* (2006.01)
*F16F 9/348* (2006.01)
*B60G 13/08* (2006.01)
*B60G 17/08* (2006.01)

(52) U.S. Cl.
CPC .............. *B60G 13/08* (2013.01); *B60G 17/08* (2013.01); *B60G 2202/24* (2013.01); *B60G 2204/62* (2013.01); *B60G 2206/41* (2013.01); *B60G 2500/11* (2013.01); *B60G 2600/21* (2013.01); *B60G 2800/162* (2013.01); *F16F 2222/12* (2013.01); *F16F 2228/066* (2013.01); *F16F 2232/08* (2013.01)

(56) References Cited

U.S. PATENT DOCUMENTS

| 2017/0080767 | A1 | 3/2017 | Yamashita |
| 2018/0128341 | A1* | 5/2018 | Mizuno .................... F16F 9/19 |
| 2018/0156301 | A1* | 6/2018 | De Kock ............. F16F 9/3488 |
| 2018/0259029 | A1* | 9/2018 | Yamashita ............. F16F 9/5126 |
| 2019/0368569 | A1 | 12/2019 | Yamashita et al. |
| 2022/0412428 | A1 | 12/2022 | Yamashita et al. |
| 2023/0101911 | A1 | 3/2023 | Kim et al. |
| 2023/0287954 | A1 | 9/2023 | Yamashita et al. |
| 2024/0376954 | A1 | 11/2024 | Kotani |

FOREIGN PATENT DOCUMENTS

| JP | 2014-70643 A | 4/2014 | |
| JP | 2019-163769 W | 9/2019 | |
| KR | 101450309 B1 * | 10/2014 | .............. F16F 9/512 |
| KR | 101876915 B1 * | 10/2014 | .............. F16F 9/512 |
| WO | WO-2014050832 A1 * | 4/2014 | .............. B60G 13/08 |
| WO | WO-2017047623 A1 * | 3/2017 | .............. F16F 9/062 |
| WO | WO-2020137207 A1 * | 7/2020 | .............. F16F 9/062 |
| WO | WO-2020174906 A1 * | 9/2020 | .............. B60G 13/08 |
| WO | WO-2022024755 A1 * | 2/2022 | ................ F16F 9/34 |
| WO | WO-2023233763 A1 * | 12/2023 | ............ F16F 9/3214 |

OTHER PUBLICATIONS

Written Opinion received in corresponding International Application No. PCT/JP2021/026439 dated Sep. 7, 2021.
International Search Report received in corresponding International Application No. PCT/JP2021/026490 dated Sep. 28, 2021.
Written Opinion received in corresponding International Application No. PCT/JP2021/026490 dated Sep. 28, 2021.
International Search Report received in corresponding International Application No. PCT/JP2021/026396 dated Sep. 21, 2021.
Written Opinion received in corresponding International Application No. PCT/JP2021/026396 dated Sep. 21, 2021.
Office Action received in U.S. Appl. No. 18/017,862 dated May 19, 2025.

* cited by examiner

SHOCK ABSORBER

The present invention relates to a shock absorber.

Priority is claimed on Japanese Patent Application No. 2020-128095 filed on Jul. 29, 2020, the content of which is incorporated herein by reference.

BACKGROUND ART

In shock absorbers, there are those having two valves that open in the same stroke (see, for example, Patent Document 1).

CITATION LIST

Patent Document

[Patent Document 1]
Japanese Examined Patent Application, Second Publication No. H2-41666

SUMMARY OF INVENTION

Technical Problem

When two valves that open in the same stroke are provided, one valve can be made to open in a region in which a piston speed is lower than that of the other valve, and both valves can be made to open in a region in which the piston speed is higher than that. In such a structure, there is a likelihood that abnormal noise will be generated especially at the time of a high-frequency input.

The present invention provides a shock absorber capable of suppressing generation of abnormal noise.

Solution to Problem

According to a first aspect of the present invention, a shock absorber includes a cylinder in which a working fluid is sealed, a piston provided to be slidable in the cylinder and partitioning the inside of the cylinder into two chambers, a piston rod connected to the piston and extending to the outside of the cylinder, a passage through which a working fluid flows from the chamber on an upstream side to the chamber on a downstream side in the cylinder due to movement of the piston, a first damping force generation mechanism provided in the passage formed in the piston to generate a damping force, and a second damping force generation mechanism disposed separately from the first damping force generation mechanism and provided in the piston rod. The second damping force generation mechanism includes a valve seat member, a sub-valve provided in the valve seat member, and a cap member covering one end side of the second damping force generation mechanism and at least a part of an outer circumference of the valve seat member. A communication passage which allows the inside and outside of the cap member to communicate is formed at one end side of the cap member. A biasing member provided so that one end surface side is in contact with an outer circumferential side of the cap member with respect to the communication passage, and a bendable flexible disc provided so that the other end surface side of the biasing member is in contact therewith are disposed.

Advantageous Effects of Invention

According to the shock absorber described above, generation of abnormal noise can be suppressed.

DESCRIPTION OF EMBODIMENTS

First Embodiment

Figure 1:
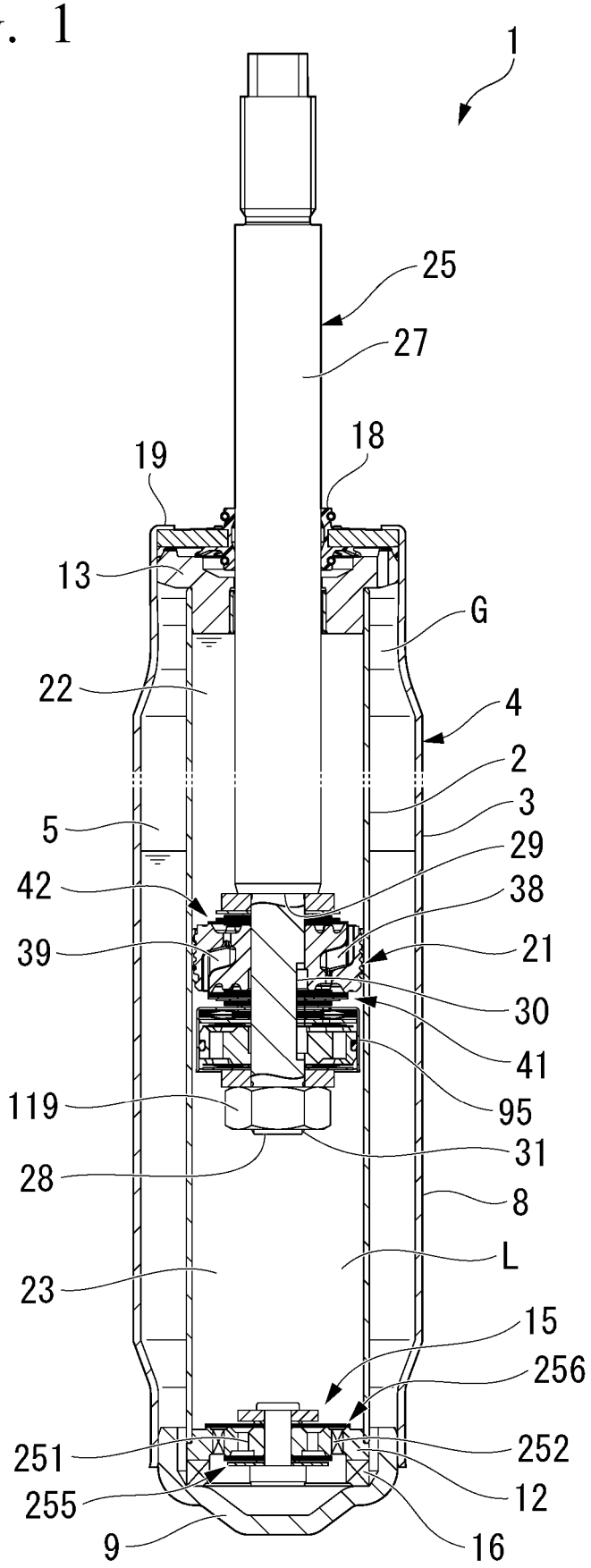
FIG. 1 is a cross-sectional view illustrating a shock absorber according to a first embodiment of the present invention.

A first embodiment will be described on the basis of FIGS. 1 to 3. Further, in the following, for convenience of explanation, an upper side in FIGS. 1 to 5, FIG. 7, FIG. 9, and FIG. 11 will be referred to with "upper" and a lower side in FIGS. 1 to 5, FIG. 7, FIG. 9, and FIG. 11 will be referred to with "lower."

<Configuration>

A shock absorber 1 of the first embodiment is a shock absorber used in a suspension device of a railway vehicle or an automobile such as a two-wheeled vehicle, a four-wheeled vehicle, or the like. Specifically, a shock absorber used in a suspension device of a four-wheeled vehicle will be described. As illustrated in FIG. 1, the shock absorber 1 is a shock absorber of a dual-tube type including a cylinder 4 having a cylindrical inner tube 2 and a bottomed cylindrical outer tube 3 which has a diameter larger than that of the inner tube 2 and is provided on an outer side of the inner tube 2 in a radial direction. A space between the outer tube 3 and the inner tube 2 is a reservoir chamber 5.

The outer tube 3 includes a barrel member 8 having a stepped cylindrical shape in which both axial end sides are smaller than an axial intermediate part in diameter, and a bottom member 9 that closes one end portion of the barrel member 8 in the axial direction. A side of the barrel member 8 opposite to the bottom member 9 is an opening.

The shock absorber 1 includes an annular valve body 12 provided at one end portion of the inner tube 2 in the axial direction, and an annular rod guide 13 provided at the other end portions of the inner tube 2 and the outer tube 3 in the axial direction. The valve body 12 constitutes a base valve 15. An outer circumferential portion of the base valve 15 has a stepped shape. An outer circumferential portion of the rod guide 13 also has a stepped shape. A large diameter portion of the rod guide 13 is fitted to the barrel member 8.

One end portion of the inner tube 2 in the axial direction is fitted to a small diameter portion of an outer circumferential portion of the valve body 12. The inner tube 2 is engaged with the bottom member 9 of the outer tube 3 via the valve body 12. The other end portion of the inner tube 2 in the axial direction is fitted to a small diameter portion of an outer circumferential portion of the rod guide 13. The inner tube 2 is engaged with the barrel member 8 of the outer tube 3 via the rod guide 13. In this state, the inner tube 2 is radially positioned with respect to the outer tube 3. Between the valve body 12 and the bottom member 9, the inner tube 2 and the outer tube 3 communicate with each other via a passage groove 16 formed in the valve body 12, thereby constituting the reservoir chamber 5 similarly to a space between the inner tube 2 and the outer tube 3.

The shock absorber 1 includes an annular seal member 18 on a side of the rod guide 13 opposite to the bottom member 9. The seal member 18 is also fitted to an inner circumferential portion of the barrel member 8 similarly to the rod guide 13. A locking part 19 is formed at an end portion of the barrel member 8 opposite to the bottom member 9 by plastically deforming the barrel member 8 inward in the radial direction by swaging processing such as curling processing. The seal member 18 is sandwiched between the locking part 19 and the rod guide 13. The seal member 18 closes the opening of the outer tube 3. Specifically, the seal member 18 is an oil seal.

The shock absorber 1 includes a piston 21 provided in the cylinder 4. The piston 21 is provided to be slidable in the inner tube 2 of the cylinder 4. The piston 21 partitions the inside of the inner tube 2 into two chambers including an upper chamber 22 and a lower chamber 23. The upper chamber 22 is provided between the piston 21 and the rod guide 13 inside the inner tube 2. The lower chamber 23 is provided between the piston 21 and the valve body 12 in the inner tube 2. The lower chamber 23 is divided from the reservoir chamber 5 by the valve body 12. In the cylinder 4, an oil fluid L is sealed as a working fluid in the upper chamber 22 and the lower chamber 23. In the reservoir chamber 5, a gas G and the oil fluid L are sealed as working fluids.

The shock absorber 1 includes a piston rod 25. In the piston rod 25, one end side portion in the axial direction is disposed inside the cylinder 4 to be connected and fixed to the piston 21, and the other end side portion extends to the outside of the cylinder 4. The piston rod 25 is made of a metal. The piston rod 25 passes through the upper chamber 22 and does not pass through the lower chamber 23. Therefore, the upper chamber 22 is a rod side chamber through which the piston rod 25 passes, and the lower chamber 23 is a bottom side chamber on the bottom member 9 side of the cylinder 4.

The piston 21 and the piston rod 25 move together. The piston 21 moves to the upper chamber 22 side in an extension stroke of the shock absorber 1 in which a protrusion amount of the piston rod 25 from the cylinder 4 increases. The piston 21 moves to the lower chamber 23 side in a compression stroke in which the protrusion amount of the piston rod 25 from the cylinder 4 decreases.

Both the rod guide 13 and the seal member 18 are annular. The piston rod 25 is slidably inserted through the inside of the rod guide 13 and the seal member 18 and extends from the inside of the cylinder 4 to the outside. One end side portion of the piston rod 25 in the axial direction is fixed to the piston 21 inside the cylinder 4. The other end side portion of the piston rod 25 in the axial direction protrudes to the outside of the cylinder 4 via the rod guide 13 and the seal member 18.

The rod guide 13 guides movement of the piston rod 25 by supporting the piston rod 25 to be movable with respect to the cylinder 4 in the axial direction while restricting its movement in the radial direction. An outer circumferential portion of the seal member 18 is in close contact with the cylinder 4. An inner circumferential portion of the seal member 18 is in sliding contact with an outer circumferential portion of the piston rod 25 that moves in the axial direction. Thereby, the seal member 18 prevents the oil fluid L and the gas G in the cylinder 4 from leaking to the outside.

The piston rod 25 includes a main shaft part 27 and a mounting shaft part 28 which has a diameter smaller than that of the main shaft part 27. The main shaft part 27 is slidably fitted to the rod guide 13 and the seal member 18. The mounting shaft part 28 is disposed in the cylinder 4 and connected to the piston 21 and the like. An end portion of the main shaft part 27 on the mounting shaft part 28 side is a shaft step part 29 which extends in a direction perpendicular to the axis.

On an outer circumferential portion of the mounting shaft part 28, a passage notch part 30 extending in the axial direction is formed at an intermediate position in the axial direction, and a male screw 31 is formed at a distal end position on a side opposite to the main shaft part 27 in the axial direction. The passage notch part 30 is formed, for example, by cutting the outer circumferential portion of the mounting shaft part 28 into a plane shape on a plane parallel to a central axis of the mounting shaft part 28. The passage notch part 30 can be formed in a so-called width across flat shape at two positions on the mounting shaft part 28 that differ by 180 degrees in the circumferential direction.

In the shock absorber 1, for example, the protruding portion of the piston rod 25 from the cylinder 4 is disposed on an upper portion to be supported by a vehicle body, and the bottom member 9 of the cylinder 4 is disposed on a lower portion to be connected to a wheel side.

Conversely, the cylinder 4 side may be supported by the vehicle body, and the piston rod 25 may be connected to the wheel side.

Figure 2:
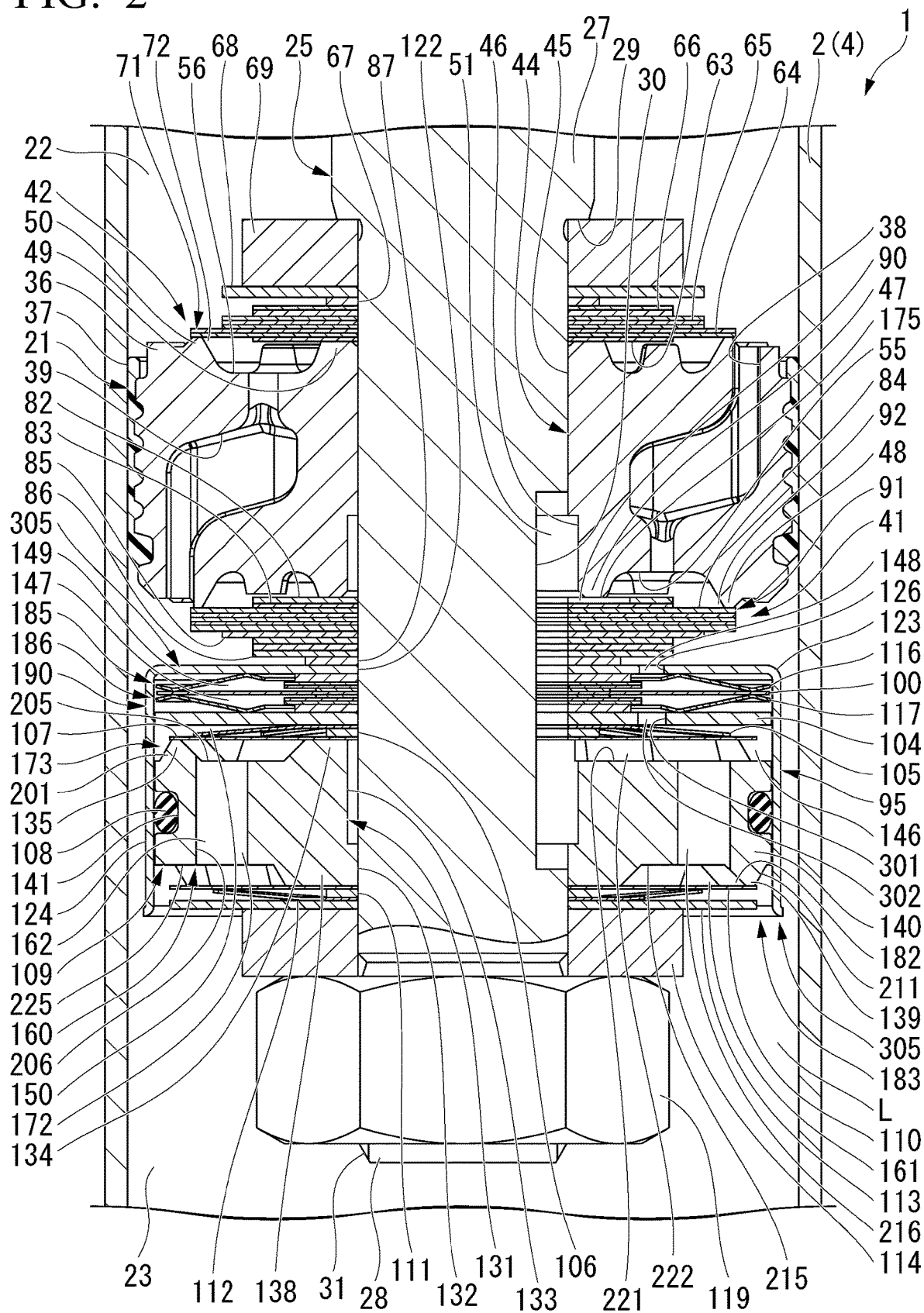
FIG. 2 is a partial cross-sectional view illustrating the vicinity of a piston of the shock absorber according to the first embodiment of the present invention.

As illustrated in FIG. 2, the piston 21 is constituted by a piston main body 36 made of a metal and connected in contact with the piston rod 25, and an annular slide member 37 made of a synthetic resin and integrally mounted on an outer circumferential surface of the piston main body 36 to slide the inside of the inner tube 2 of the cylinder 4.

The piston main body 36 includes a plurality (only one is illustrated in FIG. 2 because it is a cross section) of passage holes 38 that allow communication between the upper chamber 22 and the lower chamber 23, and a plurality (only one is illustrated in FIG. 2 because it is a cross section) of passage holes 39 that allow communication between the upper chamber 22 and the lower chamber 23.

The plurality of passage holes 38 are formed with a uniform pitch with the passage holes 39 interposed therebetween in a circumferential direction of the piston main body 36 and constitute one half of the passage holes 38 and 39 in number. The plurality of passage holes 38 have a crank shape having two bending points. The plurality of passage holes 38 on the lower chamber 23 side of the piston 21 in the axial direction open further inward in the radial direction of the piston 21 than those on the upper chamber 22 side. An annular groove 55 having an annular shape that allows the plurality of passage holes 38 to communicate with each other is formed in the piston main body 36 on the lower chamber 23 side in the axial direction.

A first damping force generation mechanism 41 is provided on the lower chamber 23 side of the annular groove 55. The first damping force generation mechanism 41 opens and closes passages in the annular groove 55 and the plurality of passage holes 38 to generate a damping force. When the first damping force generation mechanism 41 is disposed on the lower chamber 23 side, passages in the plurality of passage holes 38 and the annular groove 55 serve as extension-side passages through which the oil fluid L flows from the upper chamber 22 on an upstream side toward the lower chamber 23 on a downstream side when the piston 21 moves to the upper chamber 22 side, that is, during an extension stroke. The first damping force generation mechanism 41 provided with respect to these passages in the plurality of passage holes 38 and the annular groove 55 serves as an extension-side damping force generation mechanism that generates a damping force by suppressing a flow of the oil fluid L on the extension side from the passages in the plurality of passage holes 38 and the annular groove 55 to the lower chamber 23.

The passage holes 39 constituting the remaining half of the passage holes 38 and 39 are formed with a uniform pitch with the passage holes 38 interposed therebetween in the circumferential direction of the piston main body 36. The plurality of passage holes 39 have a crank shape having two bending points. The plurality of passage holes 39 on the upper chamber 22 side of the piston 21 in the axial direction open further inward in the radial direction of the piston 21 than those on the lower chamber 23 side. An annular groove 56 having an annular shape that allows the plurality of passage holes 39 to communicate with the upper chamber 22 side in the axial direction is formed in the piston main body 36.

A first damping force generation mechanism 42 that opens and closes passages in the plurality of passage holes 39 and the annular groove 56 to generate a damping force is provided on the upper chamber 22 side of the annular groove 56. When the first damping force generation mechanism 42 is disposed on the upper chamber 22 side, the passages in the plurality of passage holes 39 and the annular groove 56 serve as compression-side passages through which the oil fluid L flows from the lower chamber 23 on an upstream side toward the upper chamber 22 on a downstream side when the piston 21 moves to the lower chamber 23 side, that is, during a compression stroke. The first damping force generation mechanism 42 provided with respect to these passages in the plurality of passage holes 39 and the annular groove 56 serves as a compression-side damping force generation mechanism that generates a damping force by suppressing a flow of the oil fluid L on the compression side from the passages in the plurality of passage holes 39 and the annular groove 56 to the upper chamber 22.

The piston main body 36 has substantially a disc shape. At a center of the piston main body 36 in the radial direction, an insertion hole 44 into which the mounting shaft part 28 of the piston rod 25 is inserted is formed to penetrate in the axial direction. The insertion hole 44 includes a small diameter hole portion 45 on one side in the axial direction into which the mounting shaft part 28 of the piston rod 25 is fitted, and a large diameter hole portion 46 on the other side in the axial direction having a larger diameter than the small diameter hole portion 45. The small diameter hole portion 45 is provided on the upper chamber 22 side in the axial direction, and the large diameter hole portion 46 is provided on the lower chamber 23 side in the axial direction. When the mounting shaft part 28 is fitted into the small diameter hole portion 45, the piston 21 is radially positioned with respect to the piston rod 25.

At an end portion of the piston main body 36 on the lower chamber 23 side in the axial direction, an annular inner seat part 47 is formed on an inner side in the radial direction of the piston main body 36 with respect to the opening of the annular groove 55 on the lower chamber 23 side. At an end portion of the piston main body 36 on the lower chamber 23 side in the axial direction, an annular valve seat part 48 constituting a part of the first damping force generation mechanism 41 is formed on an outer side in the radial direction of the piston main body 36 with respect to the opening of the annular groove 55 on the lower chamber 23 side.

At an end portion of the piston main body 36 on the upper chamber 22 side in the axial direction, an annular inner seat part 49 is formed on an inner side in the radial direction of the piston main body 36 with respect to an opening of the annular groove 56 on the upper chamber 22 side. At an end portion of the piston main body 36 on the upper chamber 22 side in the axial direction, an annular valve seat part 50 constituting a part of the first damping force generation mechanism 42 is formed on an outer side in the radial direction of the piston main body 36 with respect to the opening of the annular groove 56 on the upper chamber 22 side.

In the insertion hole 44 of the piston main body 36, the large diameter hole portion 46 is provided on the inner seat part 47 side in the axial direction with respect to the small diameter hole portion 45. A passage in the large diameter hole portion 46 of the piston main body 36 and a piston rod passage part 51 in the passage notch part 30 of the piston rod 25 overlap in axial position and are in constant communication with each other.

In the piston main body 36, an outer side of the valve seat part 48 in the radial direction has a stepped shape whose height in the axial direction is lower than that of the valve seat part 48. The openings of the compression-side passage holes 39 on the lower chamber 23 side are disposed in the portion with the stepped shape. Similarly, in the piston main body 36, an outer side of the valve seat part 50 in the radial direction has a stepped shape whose height in the axial direction is lower than that of the valve seat part 50. The openings of the extension-side passage holes 38 on the upper chamber 22 side are disposed in the portion with the stepped shape.

The compression-side first damping force generation mechanism 42 includes the valve seat part 50 of the piston 21. The first damping force generation mechanism 42 includes one disc 63, a plurality of (specifically, two) discs 64 having the same inner diameter and the same outer diameter, a plurality of (specifically, three) discs 65 having the same inner diameter and the same outer diameter, a plurality of (specifically, two) discs 66 having the same inner diameter and the same outer diameter, one disc 67, one disc 68, and one annular member 69 in that order from the piston 21 side in the axial direction. The discs 63 to 68 and the annular member 69 are made of a metal and each have a bored disc shape with a constant thickness. The discs 63 to 68 and the annular member 69 are all radially positioned with respect to the piston rod 25 with the mounting shaft part 28 fitted therein. The discs 63 to 68 are plane discs (planar discs without a protrusion protruding in the axial direction).

The disc 63 has an outer diameter larger than an outer diameter of the inner seat part 49 of the piston 21 and smaller than an inner diameter of the valve seat part 50. The disc 63 is in constant contact with the inner seat part 49. The plurality of discs 64 have an outer diameter equal to an outer diameter of the valve seat part 50 of the piston 21. The plurality of discs 64 can be seated on the valve seat part 50. The plurality of discs 65 have an outer diameter smaller than an outer diameter of the discs 64. The plurality of discs 66 have an outer diameter smaller than the outer diameter of the discs 65. The disc 67 has an outer diameter smaller than the outer diameter of the discs 66 and equal to the outer diameter of the inner seat part 49 of the piston 21. The disc 68 has an outer diameter equal to the outer diameter of the discs 65. The annular member 69 has an outer diameter smaller than the outer diameter of the disc 68 and larger than an outer diameter of the shaft step part 29 of the piston rod 25. The annular member 69 has a larger thickness and higher rigidity than the discs 63 to 68. The annular member 69 is in contact with the shaft step part 29.

The plurality of discs 64, the plurality of discs 65, and the plurality of discs 66 constitute a compression-side main valve 71 that can be separated from and seated on the valve seat part 50. When the main valve 71 is separated from the valve seat part 50, the passages in the plurality of passage holes 39 and the annular groove 56 are allowed to communicate with the upper chamber 22, and a flow of the oil fluid L between the main valve 71 and the valve seat part 50 is suppressed to generate a damping force. The annular member 69, together with the disc 68, restricts deformation of the main valve 71 in an opening direction beyond a specified limit by coming into contact with the main valve 71.

The passages in the plurality of passage holes 39 and the annular groove 56 and the passage between the main valve 71 and the valve seat part 50 that appears when the valve opens are formed in the piston 21, and constitute a compression-side first passage 72 in which the oil fluid L flows from the lower chamber 23 on the upstream side to the upper chamber 22 on the downstream side in the cylinder 4 due to movement of the piston 21 to the lower chamber 23 side. The compression-side first damping force generation mechanism 42 generating a damping force includes the main valve 71 and the valve seat part 50. Therefore, the first damping force generation mechanism 42 is provided in the first passage 72. The first passage 72 is formed in the piston 21 that includes the valve seat part 50. The oil fluid L passes through the first passage 72 when the piston rod 25 and the piston 21 move to the compression side.

In the compression-side first damping force generation mechanism 42, a fixed orifice that allows communication between the upper chamber 22 and the lower chamber 23 even in a state in which the valve seat part 50 and the main valve 71 that is in contact with the valve seat part 50 are in contact with each other is not formed in either of the valve seat part 50 and the main valve 71. That is, the compression-side first damping force generation mechanism 42 does not allow communication between the upper chamber 22 and the lower chamber 23 if the valve seat part 50 and the main valve 71 are in contact with each other over the entire circumference. In other words, the first passage 72 does not include a fixed orifice formed to allow constant communication between the upper chamber 22 and the lower chamber 23 and is not a passage that allows constant communication between the upper chamber 22 and the lower chamber 23.

The extension-side first damping force generation mechanism 41 includes the valve seat part 48 of the piston 21. The first damping force generation mechanism 41 includes one disc 82, one disc 83, a plurality of (specifically, four) discs 84 having the same inner diameter and the same outer diameter, one disc 85, a plurality of (specifically three) discs 86 having the same inner diameter and the same outer diameter, and one disc 87 in that order from the piston 21 side in the axial direction. The discs 82 to 87 are plane discs made of a metal each having a bored disc shape with a constant thickness. The discs 82 to 87 are all radially positioned with respect to the piston rod 25 with the mounting shaft part 28 fitted therein.

The disc 82 has an outer diameter larger than an outer diameter of the inner seat part 47 of the piston 21 and smaller than an inner diameter of the valve seat part 48. The disc 82 is in constant contact with the inner seat part 47. As illustrated in FIG. 3, a notch part 90 that allows the passages in the annular groove 55 and the plurality of passage holes 38 to constantly communicate with the passage in the large diameter hole portion 46 of the piston 21 and the piston rod passage part 51 in the passage notch part 30 of the piston rod 25 is formed in the disc 82 from an intermediate position on an outer side of the inner seat part 47 in the radial direction to an inner circumferential edge portion thereof. The notch part 90 is formed at the time of press-forming the disc 82. The notch part 90 is adjacent to and faces the large diameter hole portion 46 of the piston 21. The disc 83 has the same outer diameter as the disc 82 but a notch part as in the disc 82 is not formed therein. The plurality of discs 84 have an outer diameter equal to an outer diameter of the valve seat part 48 of the piston 21. The plurality of discs 84 can be seated on the valve seat part 48. The disc 85 has an outer diameter smaller than the outer diameter of the discs 84. The plurality of discs 86 have an outer diameter smaller than the outer diameter of the disc 85. The disc 87 has an outer diameter smaller than the outer diameter of the discs 86 and slightly larger than the outer diameter of the inner seat part 47 of the piston 21.

The plurality of discs 84, the one disc 85, and the plurality of discs 86 constitute an extension-side main valve 91 that can be separated from and seated on the valve seat part 48. When the main valve 91 is separated from the valve seat part 48, the passages in the annular groove 55 and the plurality of passage holes 38 are allowed to communicate with the lower chamber 23, and a flow of the oil fluid L between the main valve 91 and the valve seat part 48 is suppressed to generate a damping force.

As illustrated in FIG. 2, the passages in the plurality of passage holes 38 and the annular groove 55 and a passage between the main valve 91 and the valve seat part 48 that appears when the valve opens are formed in the piston 21, and constitute an extension-side first passage 92 in which the oil fluid L flows from the upper chamber 22 on the upstream side to the lower chamber 23 on the downstream side in the cylinder 4 due to movement of the piston 21 to the upper chamber 22 side. The extension-side first damping force generation mechanism 41 generating a damping force includes the main valve 91 and the valve seat part 48. Therefore, the first damping force generation mechanism 41 is provided in the first passage 92. The first passage 92 is formed in the piston 21 that includes the valve seat part 48. The oil fluid L passes through the first passage 92 when the piston rod 25 and the piston 21 move to the extension side.

In the extension-side first damping force generation mechanism 41, a fixed orifice that allows communication between the upper chamber 22 and the lower chamber 23 even in a state in which the valve seat part 48 and the main valve 91 that is in contact with the valve seat part 48 are in contact with each other is not formed in either of the valve seat part 48 and the main valve 91. That is, the extension-side first damping force generation mechanism 41 does not allow communication between the upper chamber 22 and the lower chamber 23 if the valve seat part 48 and the main valve 91 are in contact with each other over the entire circumference. In other words, the first passage 92 does not have a fixed orifice formed to allow constant communication between the upper chamber 22 and the lower chamber 23 and is not a passage that allows constant communication between the upper chamber 22 and the lower chamber 23.

Figure 3:
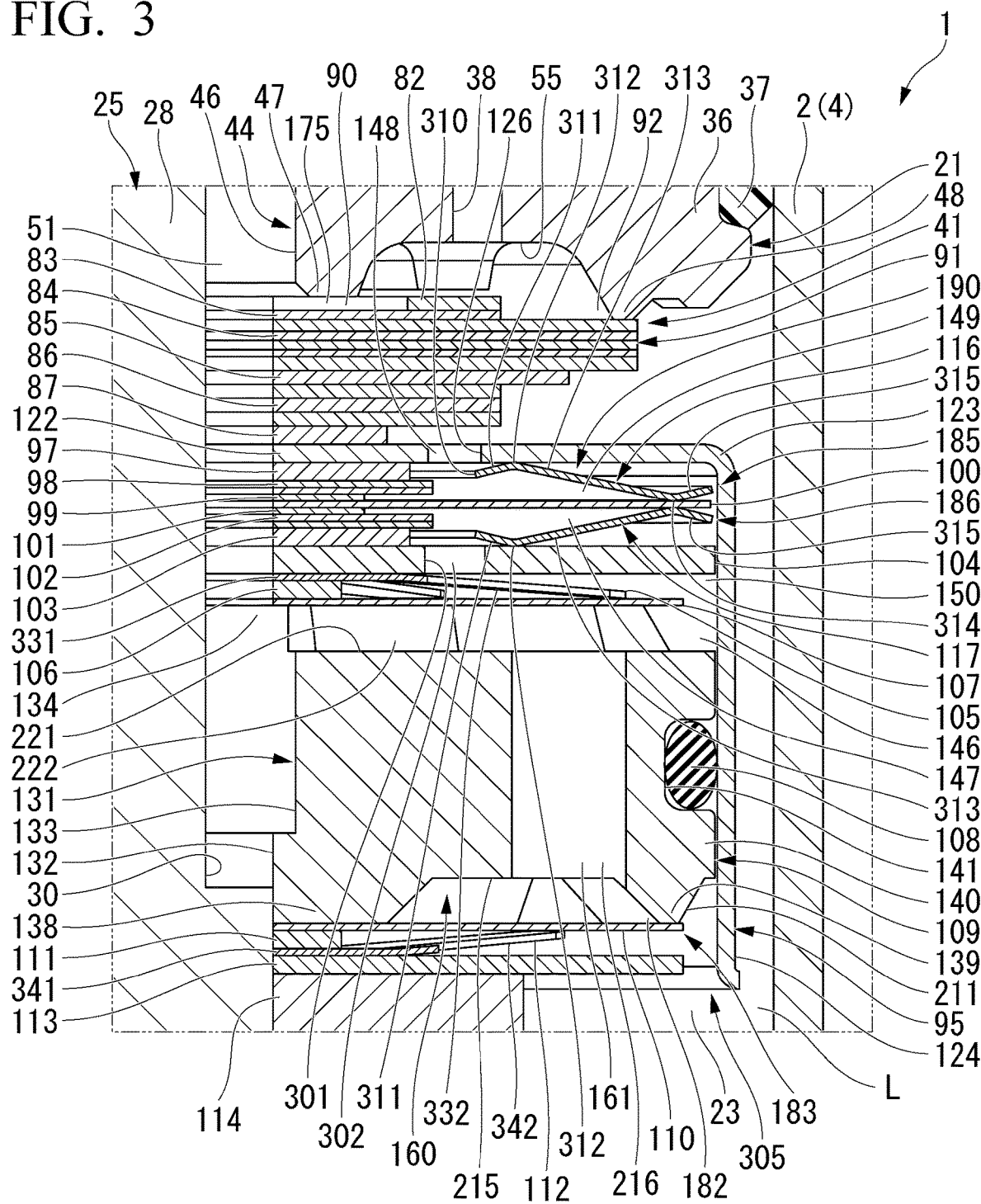
FIG. 3 is a partial cross-sectional view illustrating a main part of the shock absorber according to the first embodiment of the present invention.

As illustrated in FIG. 3, on a side of the extension-side first damping force generation mechanism 41 opposite to the piston 21, one cap member main body 95, one disc 97, a plurality of (specifically, two) discs 98 having the same inner diameter and the same outer diameter, one disc 99, one flexible disc 100, one disc 101, a plurality of (specifically, two) discs 102 having the same inner diameter and the same outer diameter, one disc 103, one spring contact disc 104, one spring member 105, one disc 106, one sub-valve 107, one valve seat member 109 in which one O-ring 108 is provided on an outer circumferential side, one sub-valve 110, one disc 111, one spring member 112, one disc 113, and one annular member 114 are provided in that order from the first damping force generation mechanism 41 side with the mounting shaft part 28 of the piston rod 25 fitted to inner sides thereof. The cap member main body 95, the discs 97 to 99, the flexible disc 100, the discs 101 to 103, the spring contact disc 104, the spring member 105, the disc 106, the sub-valve 107, the valve seat member 109, the sub-valve 110, the disc 111, the spring member 112, the disc 113, and the annular member 114 are radially positioned with respect to the piston rod 25 when the mounting shaft part 28 is fitted to inner sides thereof.

An annular disc spring 116 (biasing member) is provided on an outer side of the disc 97, the discs 98, and the disc 99 in the radial direction. An annular disc spring 117 (biasing member) is provided on an outer side of the disc 101, the discs 102, and the disc 103 in the radial direction.

As illustrated in FIG. 2, the male screw 31 is formed on the mounting shaft part 28 of the piston rod 25 at a portion protruding further than the annular member 114. A nut 119 is screwed onto the male screw 31. The nut 119 is in contact with the annular member 114.

The annular member 69, the discs 63 to 68, the piston 21, the discs 82 to 87, the cap member main body 95, and the discs 97 to 99 illustrated in FIG. 3, the flexible disc 100, the discs 101 to 103, the spring contact disc 104, the spring member 105, the disc 106, the sub-valve 107, the valve seat member 109, the sub-valve 110, the disc 111, the spring member 112, the disc 113, and the annular member 114 are axially clamped at least at their radially inner circumferential sides by the shaft step part 29 of the piston rod and the nut 119 and fixed to the piston rod 25 as illustrated in FIG. 2. In this state, as illustrated in FIG. 3, the discs 97 to 99, the flexible disc 100, the discs 101 to 103, the spring contact disc 104, the spring member 105, the disc 106, the sub-valve 107, the valve seat member 109, the sub-valve 110, the disc 111, the spring member 112, and the disc 113 are disposed in the cap member main body 95.

The cap member main body 95, the discs 97 to 99, 101 to 103, 106, 111, and 113, the flexible disc 100, the spring contact disc 104, the spring members 105 and 112, the sub-valves 107 and 110, the valve seat member 109, and the annular member 114, and the disc springs 116 and 117 are all made of metals. The discs 97 to 99, 101 to 103, 106, 111, and 113, the flexible disc 100, the spring contact disc 104, the sub-valves 107 and 110, and the annular member 114 are all plane discs having a bored disc shape with a constant thickness. The cap member main body 95, the valve seat member 109, and the spring members 105 and 112 are annular.

The cap member main body 95 is an integrally formed product having a bottomed cylindrical shape. The cap member main body 95 is formed by, for example, plastic working or cutting work of a metal plate. The cap member main body 95 includes a bottom part 122 having a bored disc shape with a constant thickness, an intermediate curved part 123 extending from an outer circumferential edge portion of the bottom part 122 to one side of the bottom part 122 in the axial direction while a diameter thereof increases, and a cylindrical part 124 having a cylindrical shape extending in a direction opposite to the bottom part 122 from an end edge portion of the intermediate curved part 123 on a side opposite to the bottom part 122.

The bottom part 122 has a bored disc shape with a constant width in the radial direction over the entire circumference. The mounting shaft part 28 of the piston rod 25 is fitted to an inner circumferential portion of the bottom part 122. When the mounting shaft part 28 is fitted to the inner circumferential portion of the bottom part 122, the cap member main body 95 is radially positioned with respect to the piston rod 25 and coaxially disposed therewith. Between the inner circumferential portion and the outer circumferential portion of the bottom part 122, a plurality of passage holes 126 are formed to penetrate the bottom part 122 in an axial direction of the bottom part 122. The plurality of passage holes 126 are disposed at regular intervals in a circumferential direction of the bottom part 122 at positions equidistant from a center of the bottom part 122. In the cap member main body 95, the bottom part 122 is disposed to be positioned on the piston 21 side with respect to the cylindrical part 124 and is in contact with the disc 87. The cap member main body 95 is fitted onto the mounting shaft part 28 at the inner circumferential portion of the bottom part 122. An outer diameter of the disc 87 is smaller than twice a shortest distance connecting a radial center of the cap member main body 95 and the passage hole 126.

The intermediate curved part 123 has an annular shape that is coaxial with the bottom part 122. A cross section of the intermediate curved part 123 in a plane including a central axis thereof has a curved shape that is convex outward in the radial direction and toward the bottom part 122 side in the axial direction. The cylindrical part 124 is also coaxial with the bottom part 122 and the intermediate curved part 123.

The cap member main body 95 has a thickness larger than a thickness of one of the discs 84 to 86 in addition to having a bottomed cylindrical shape, and therefore has higher rigidity than the discs 84 to 86. Therefore, the cap member main body 95 restricts deformation of the main valve 91, which is constituted by the plurality of discs 84 to 86, in an opening direction beyond a specified limit by coming into contact with the main valve 91.

The disc 97 has a constant width in the radial direction over the entire circumference. An outer diameter of the disc 97 is smaller than twice a shortest distance connecting the radial center of the cap member main body 95 and the passage hole 126. The disc 97 has the same thickness as the bottom part 122 of the cap member main body 95.

The discs 98 have a constant width in the radial direction over the entire circumference. An outer diameter of the disc 98 is larger than an outer diameter of the disc 97 and slightly larger than twice a shortest distance connecting the radial center of the cap member main body 95 and the passage hole 126. A thickness of one of the discs 98 is smaller than a thickness of the disc 97.

The disc 99 has a constant width in the radial direction over the entire circumference. An outer diameter of the disc 99 is smaller than the outer diameter of the disc 97. The disc 99 has a thickness equivalent to the thickness of one of the discs 98.

The flexible disc 100 has a constant width in the radial direction over the entire circumference. An outer diameter of the flexible disc 100 is larger than twice a longest distance connecting the radial center of the cap member main body 95 and the passage hole 126, and is slightly smaller than an inner diameter of the cylindrical part 124 of the cap member main body 95. The flexible disc 100 has a thickness equivalent to a thickness of the disc 99.

The disc 101 is a common part having the same shape as the disc 99. The disc 102 is a common part having the same shape as the disc 98. The disc 103 is a common part having the same shape as the disc 97.

The spring contact disc 104 has a constant width in the radial direction over the entire circumference. An outer diameter of the spring contact disc 104 is slightly smaller than the inner diameter of the cylindrical part 124 of the cap member main body 95. Therefore, there is a gap between the spring contact disc 104 and the cylindrical part 124 of the cap member main body 95. A passage hole 301 is formed to penetrate the spring contact disc 104 in the axial direction so that a position of the spring contact disc 104 in the radial direction is substantially coincident with the passage hole 126 of the cap member main body 95.

The inside of the passage hole 301 is a communication passage 302. The spring contact disc 104, together with the cap member main body 95, constitutes a cap member 305. The bottom part 122 of the cap member main body 95 constitutes one bottom part of the cap member 305, and the spring contact disc 104 constitutes the other bottom part of the cap member 305.

The disc spring 116 is provided between the bottom part 122 of the cap member main body 95 and the flexible disc 100. The disc spring 116 is formed by press forming a single plate material. The disc spring 116 has a bored disc shape in which a hole 310 is formed at a center in the radial direction and a width in the radial direction is constant over the entire circumference. The discs 97 to 99 are disposed on an inner side of the disc spring 116 in the radial direction with a gap with respect to an inner circumferential edge portion of disc spring 116 in the radial direction. The cylindrical part 124 of the cap member main body 95 is disposed on an outer side of the disc spring 116 in the radial direction. The disc spring 116 includes an inner tapered plate part 311, an inner curved plate part 312, an intermediate tapered plate part 313, an outer curved plate part 314, and an outer tapered plate part 315 in order from an inner circumferential edge portion side toward an outer circumferential edge portion side thereof.

The inner tapered plate part 311 has a constant width in the radial direction over the entire circumference. An inner circumferential edge portion of the inner tapered plate part 311 is the inner circumferential edge portion of the disc spring 116. An inner side of the inner circumferential edge portion is the hole 310. The inner tapered plate part 311 has a tapered shape that extends outward in the radial direction from the inner circumferential edge portion thereof to be inclined such that it is positioned further toward the bottom part 122 side in the axial direction toward the outside in the radial direction. An inner diameter of the inner tapered plate part 311, that is, an inner diameter of the hole 310, is larger than the outer diameter of the disc 98.

The intermediate tapered plate part 313 has a constant width in the radial direction over the entire circumference. The intermediate tapered plate part 313 has a tapered shape that extends outward in the radial direction from an outer circumferential side of the inner tapered plate part 311 to be inclined such that it is positioned further toward the flexible disc 100 side in the axial direction toward the outside in the radial direction. The intermediate tapered plate part 313 has a radial width larger than a radial width of the inner tapered plate part 311. The intermediate tapered plate part 313 has an axial length larger than an axial length of the inner tapered plate part 311.

The outer tapered plate part 315 has a constant width in the radial direction over the entire circumference. The outer tapered plate part 315 has a tapered shape that extends outward in the radial direction from an outer circumferential side of the intermediate tapered plate part 313 to be inclined such that it is positioned further toward the bottom part 122 side in the axial direction toward the outside in the radial direction. The outer tapered plate part 315 has a radial width smaller than the radial width of the intermediate tapered plate part 313 and equal to the radial width of the inner tapered plate part 311. The outer tapered plate part 315 has an axial length smaller than the axial length of the intermediate tapered plate part 313 and equal to the axial length of the inner tapered plate part 311. An outer circumferential edge portion of the outer tapered plate part 315 is an outer circumferential edge portion of the disc spring 116. An outer diameter of the disc spring 116 is slightly smaller than the inner diameter of the cylindrical part 124 of the cap member main body 95.

The inner curved plate part 312 is formed between the inner tapered plate part 311 and the intermediate tapered plate part 313 by bending the intermediate tapered plate part 313 with respect to the inner tapered plate part 311. The inner curved plate part 312 connects the outer circumferential side of the inner tapered plate part 311 and an inner circumferential side of the intermediate tapered plate part 313. A cross section of the inner curved plate part 312 in a plane including a central axis of the disc spring 116 has an arcuate shape that is convex toward the bottom part 122 side. The inner curved plate part 312 has a circular shape centered on the central axis of the disc spring 116. The inner curved plate part 312 is disposed on the same plane perpendicular to the center axis of the disc spring 116 over the entire circumference.

The disc spring 116 is in contact with the bottom part 122 at the inner curved plate part 312. The inner curved plate part 312 is in contact with the bottom part 122 at a position on a radially outer side of all the passage holes 126 of the bottom part 122 over the entire circumference.

The outer curved plate part 314 is formed between the intermediate tapered plate part 313 and the outer tapered plate part 315 by bending the outer tapered plate part 315 with respect to the intermediate tapered plate part 313. The outer curved plate part 314 connects the outer circumferential side of the intermediate tapered plate part 313 and an inner circumferential side of the outer tapered plate part 315. A cross section of the outer curved plate part 314 in a plane including the central axis of the disc spring 116 has an arcuate shape that is convex toward the flexible disc 100 side. The outer curved plate part 314 has a circular shape centered on the central axis of the disc spring 116. The outer curved plate part 314 is disposed on the same plane perpendicular to the center axis of the disc spring 116 over the entire circumference. The disc spring 116 is in contact with the flexible disc 100 over the entire circumference at the outer curved plate part 314. The outer circumferential edge portion of the outer tapered plate part 315, that is, the outer circumferential edge portion of the disc spring 116, is spaced apart from the bottom part 122 and the flexible disc 100 in the axial direction over the entire circumference.

The cap member main body 95, the discs 97 to 99, and the flexible disc 100 are radially positioned with respect to the mounting shaft part 28 of the piston rod 25 to be fixed. On the other hand, a range of movement of the disc spring 116 in a radial direction of the piston rod 25 is determined when the disc spring 116 comes into contact with the cylindrical part 124 of the cap member main body 95. In other words, in the radial direction of the piston rod 25, the disc spring 116 is movable slightly in the radial direction within an inner range of the cylindrical part 124 of the cap member main body 95 with respect to the cap member main body 95, the discs 97 to 99, and the flexible disc 100 which do not move. However, even if the disc spring 116 moves to the maximum in the radial direction, the disc spring 116 maintains a state in which the inner curved plate part 312 is in contact with a position of the bottom part 122 on a radially outer side of all the passage holes 126 of the bottom part 122 over the entire circumference and maintains a state in which the outer curved plate part 314 is in contact with the flexible disc 100 over the entire circumference. An outer circumferential end portion of the disc spring 116 comes into contact with the cylindrical part 124 of the cap member main body 95 that covers the valve seat member 109.

The disc spring 117 is provided between the flexible disc 100 and the spring contact disc 104. The disc spring 117 is a common part having the same shape as the disc spring 116. The disc spring 117 is directed in a direction opposite to the disc spring 116 in the axial direction. The discs 101 to 103 are disposed on an inner side of the disc spring 117 in the radial direction with a gap with respect to an inner circumferential edge portion of disc spring 117 in the radial direction.

The inner tapered plate part 311 of the disc spring 117 extends outward in the radial direction from an inner circumferential edge portion thereof to be inclined such that it is positioned further toward spring contact disc 104 side in the axial direction toward the outside in the radial direction. The intermediate tapered plate part 313 of the disc spring 117 extends outward in the radial direction from an outer circumferential side of the inner tapered plate part 311 to be inclined such that it is positioned further toward the flexible disc 100 side in the axial direction toward the outside in the radial direction. The outer tapered plate part 315 of the coned disc spring 117 extends outward in the radial direction from an outer circumferential side of the intermediate tapered plate part 313 to be inclined such that it is positioned further toward the spring contact disc 104 side in the axial direction toward the outside in the radial direction.

The inner curved plate part 312 of the disc spring 117 is in contact with the spring contact disc 104 at a position on a radially outer side of all the passage holes 301 of the spring contact disc 104 over the entire circumference. The outer curved plate part 314 of the disc spring 117 is in contact with the flexible disc 100 over the entire circumference. An outer circumferential edge portion of disc spring 117 is spaced apart from spring contact disc 104 and the flexible disc 100 in the axial direction over the entire circumference. A range of movement of the disc spring 117 in the radial direction of the piston rod 25 is also determined when the disc spring 117 comes into contact with the cylindrical part 124 of the cap member main body 95. Even if the disc spring 117 moves to the maximum within an inner range of the cylindrical part 124 of the cap member main body 95, the disc spring 117 maintains a state in which the inner curved plate part 312 is in contact with the spring contact disc 104 at a position on a radially outer side of all the passage holes 301 of the spring contact disc 104 over the entire circumference and maintains a state in which the outer curved plate part 314 is in contact with the flexible disc 100 over the entire circumference. An outer circumferential end portion of the disc spring 117 comes into contact with the cylindrical part 124 of the cap member main body 95 that covers the valve seat member 109.

The spring member 105 includes a base plate part 331 having a bored disc shape fitted to the mounting shaft part 28, and a plurality of spring plate parts 332 extending outward in a radial direction of the base plate part 331 from equally spaced positions of the base plate part 331 in the circumferential direction. The base plate part 331 has an outer diameter slightly smaller than twice a minimum distance from a center of the spring contact disc 104 to the passage hole 301. The spring plate parts 332 are each inclined with respect to the base plate part 331 to become further away from the base plate part 331 in an axial direction of the base plate part 331 toward an extended distal end side. The spring member 105 is attached to the mounting shaft part 28 so that the spring plate part 332 extends from the base plate part 331 to the sub-valve 107 side in the axial direction of the base plate part 331.

The disc 106 has an outer diameter smaller than an outer diameter of the base plate part 331 of the spring member 105. In the spring member 105, the base plate part 331 is in contact with the disc 106, and the plurality of spring plate parts 332 are in contact with the sub-valve 107.

As illustrated in FIG. 2, the valve seat member 109 has a bored disc shape in which a through hole 131 extending in an axial direction of the valve seat member 109 and penetrating in a thickness direction to insert the mounting shaft part 28 therein is formed at a center in the radial direction. The through hole 131 includes a small diameter hole portion 132 on one side in the axial direction into which the mounting shaft part 28 of the piston rod 25 is fitted, and a large diameter hole portion 133 on the other side in the axial direction having a larger diameter than the small diameter hole portion 132.

The valve seat member 109 includes an inner seat part 134 that has an annular shape to surround the large diameter hole portion 133 at an end portion on the large diameter hole portion 133 side in the axial direction. The valve seat member 109 includes a valve seat part 135 extending outward in the radial direction from the inner seat part 134. The valve seat member 109 includes an inner seat part 138 that has an annular shape to surround the small diameter hole portion 132 at an end portion on the small diameter hole portion 132 side on a side opposite to the large diameter hole portion 133 in the axial direction. The valve seat member 109 includes a valve seat part 139 extending outward in the radial direction from the inner seat part 138. A main body part 140 having a bored disc shape is provided between the inner seat part 134 and valve seat part 135, and the inner seat part 138 and valve seat part 139 in the axial direction of the valve seat member 109.

The inner seat part 134 protrudes to one side in the axial direction of the main body part 140 from an inner circumferential edge portion of the main body part 140 on the large diameter hole portion 133 side in the axial direction. The valve seat part 135 also protrudes from the main body part 140 to the same side as the inner seat part 134 in the axial direction of the main body part 140 at an outer side of the inner seat part 134 in the radial direction. Distal end surfaces of the inner seat part 134 and the valve seat part 135 on the protruding side, that is, distal end surfaces thereof on a side opposite to the main body part 140, are flat surfaces. The inner seat part 134 and the valve seat part 135 extend in a direction perpendicular to an axis of the valve seat member 109 and are disposed on the same plane.

The inner seat part 138 protrudes to a side opposite to the inner seat part 134 in the axial direction of the main body part 140 from an inner circumferential edge portion of the main body part 140 on the small diameter hole portion 132 side in the axial direction. The valve seat part 139 also protrudes from the main body part 140 to the same side as the inner seat part 138 in the axial direction of the main body part 140 at an outer side of the inner seat part 138 in the radial direction. Distal end surfaces of the inner seat part 138 and the valve seat part 139 on the protruding side, that is, distal end surfaces thereof on a side opposite to the main body part 140, are flat surfaces. The inner seat part 138 and the valve seat part 139 extend in a direction perpendicular to the axis of the valve seat member 109 and are disposed on the same plane. The inner seat parts 134 and 138 have the same outer diameter.

The valve seat part 135 is a deformed seat having a petal shape. The valve seat part 135 includes a plurality of valve seat constituent parts 201 (only one is illustrated in FIG. 2 because it is a cross section). These valve seat constituent parts 201 have the same shape and are disposed at regular intervals in a circumferential direction of the valve seat member 109. The inner seat part 134 has an annular shape centered on a central axis of the valve seat member 109.

Inside each of the valve seat constituent parts 201, a passage recess 205 that is surrounded by the valve seat constituent part 201 and a part of the inner seat part 134 and is recessed in the axial direction of the valve seat member 109 from the distal end surfaces thereof on the protruding side is formed. A bottom surface of the passage recess 205 is formed with the main body part 140. The passage recess 205 is formed on an inner side of all the valve seat constituent parts 201.

A passage hole 206 penetrating the valve seat member 109 in the axial direction by penetrating the main body part 140 in the axial direction is formed at a central position of the passage recess 205 in the circumferential direction of the valve seat member 109.

The passage hole 206 is a linear hole parallel to the central axis of the valve seat member 109. The passage hole 206 is formed in the bottom surfaces of all the passage recesses 205.

The valve seat part 139 is also a deformed seat having a petal shape. The valve seat part 139 includes a plurality of valve seat constituent parts 211 (only one is illustrated in FIG. 2 because it is a cross section). These valve seat constituent parts 211 have the same shape and are disposed at regular intervals in the circumferential direction of the valve seat member 109. The valve seat constituent parts 211 have the same shape as the valve seat constituent parts 201. The inner seat part 138 has an annular shape centered on the central axis of the valve seat member 109.

Inside each of the valve seat constituent parts 211, a passage recess 215 that is surrounded by the valve seat constituent part 211 and a part of the inner seat part 138 and is recessed in the axial direction of the valve seat member 109 from the distal end surfaces thereof on the protruding side is formed. A bottom surface of the passage recess 215 is formed with the main body part 140. The passage recess 215 is formed on an inner side of all the valve seat constituent parts 211.

A passage hole 216 penetrating the valve seat member 109 in the axial direction by penetrating the main body part 140 in the axial direction is formed at a central position of the passage recess 215 in the circumferential direction of the valve seat member 109.

The passage hole 216 is a linear hole parallel to the central axis of the valve seat member 109. The passage hole 216 is formed in the bottom surfaces of all the passage recesses 215.

A disposition pitch of the plurality of valve seat constituent parts 201 in the circumferential direction of the valve seat member 109 is the same as a disposition pitch of the plurality of valve seat constituent parts 211 in the circumferential direction of the valve seat member 109. The valve seat constituent parts 201 and the valve seat constituent parts 211 are shifted from each other by half a pitch. The passage hole 206 is disposed between the valve seat constituent parts 211 adjacent to each other in the circumferential direction of the valve seat member 109. Therefore, the passage hole 206 is disposed outside a range of the valve seat part 139. The passage hole 216 is disposed between the valve seat constituent parts 201 adjacent to each other in the circumferential direction of the valve seat member 109. Therefore, the passage hole 216 is disposed outside a range of the valve seat part 135.

A passage groove 221 crossing the inner seat part 134 in the radial direction is formed in the valve seat member 109 on the large diameter hole portion 133 side in the axial direction. The passage groove 221 is formed to be recessed in the axial direction of the valve seat member 109 from the distal end surface of the inner seat part 134 on a side opposite to the main body part 140. The passage groove 221 also includes a space between the valve seat constituent parts 201 adjacent to each other in the circumferential direction of the valve seat member 109. The passage hole 216 opens to the bottom surface of the passage groove 221. The passage groove 221 allows the passage hole 216 and the large diameter hole portion 133 to communicate with each other.

The passage hole 216 and the passage recess 215 to which the passage hole 216 opens form a first passage part 161 provided in the valve seat member 109. A plurality of first passage parts 161 are provided in the valve seat member 109 at regular intervals in the circumferential direction of the valve seat member 109. The passage groove 221 forms a radial passage 222 extending in the radial direction toward the first passage part 161. A plurality of radial passages 222 are provided in the valve seat member 109 at regular intervals in the circumferential direction of the valve seat member 109.

The valve seat member 109 includes a passage groove 225 formed between valve seat constituent parts 211 adjacent to each other in the circumferential direction of the valve seat member 109. The passage hole 206 opens to a bottom surface of the passage groove 225. Therefore, the passage groove 225 communicates with the passage hole 206.

The passage hole 206 and the passage recess 205 to which the passage hole 206 opens form a second passage part 162 provided in the valve seat member 109. A plurality of second passage parts 162 are provided in the valve seat member 109 at regular intervals in the circumferential direction of the valve seat member 109.

The plurality of first passage parts 161 and the plurality of second passage parts 162 constitute a valve seat member passage part 160 provided in the valve seat member 109 to allow the oil fluid L to flow.

In the valve seat member 109, an annular seal groove 141 recessed inward in the radial direction is formed at an axially intermediate position of an outer circumferential portion of the main body part 140. The O-ring 108 is disposed in the seal groove 141. The valve seat member 109 is fitted to the cylindrical part 124 of the cap member main body 95 at an outer circumferential portion thereof with the inner seat part 138 and the valve seat part 139 directed toward a side opposite to the bottom part 122. In this state, the O-ring 108 seals a gap between the cylindrical part 124 of the cap member main body 95 and the valve seat member 109.

The cap member main body 95, the O-ring 108, and the valve seat member 109 form a cap chamber 146 on an inner side of the cap member main body 95. The cap chamber 146 is provided between the bottom part 122 and the valve seat member 109 of the cap member main body 95. As illustrated in FIG. 3, the discs 97 to 99, 101 to 103, and 106, the flexible disc 100, the spring contact disc 104, the spring member 105, the sub-valve 107, and the disc springs 116 and 117 are provided inside the cap chamber 146.

A lower chamber communication chamber 149 is formed in the cap chamber 146 by being surrounded by the flexible disc 100, the disc spring 116, the discs 97 to 99, and the bottom part 122 of the cap member main body 95. The lower chamber communication chamber 149 is in constant communication with communication passages 148 in the plurality of passage holes 126 of the bottom part 122 of the cap member main body 95.

An upper chamber communication chamber 147 is formed in the cap chamber 146 by being surrounded by the flexible disc 100, the disc spring 117, the discs 101 to 103, and the spring contact disc 104. The upper chamber communication chamber 147 is in constant communication with the communication passages 302 in the plurality of passage holes 301 of the spring contact disc 104. Communication between the lower chamber communication chamber 149 and the upper chamber communication chamber 147 is blocked by the flexible disc 100.

As illustrated in FIG. 2, the annular valve seat member 109 and the bottomed cylindrical cap member 305 are disposed in the lower chamber 23. At this time, in the valve seat member 109, the valve seat part 135 is disposed on the cap chamber 146 side and the valve seat part 139 is disposed on the lower chamber 23 side. The communication passages 148 of the bottom part 122 of the cap member main body 95 are in constant communication with the lower chamber 23.

A space between the valve seat member 109 of the cap chamber 146 and the spring contact disc 104 is an intermediate chamber 150 that is in constant communication with the upper chamber communication chamber 147 via the communication passages 302. The intermediate chamber 150 is in constant communication with the upper chamber 22 through the radial passage 222 in the passage groove 221 of the valve seat member 109, the passage in the large diameter hole portion 133 of the valve seat member 109, the piston rod passage part 51 in the passage notch part 30 of the piston rod 25 and the passage in the large diameter hole portion 46 of the piston 21, the passage in the notch part 90 of the disc 82, and the passages in the annular groove 55 and the plurality of passage holes 38 of the piston 21. Therefore, the upper chamber communication chamber 147 is in constant communication with the upper chamber 22 via the intermediate chamber 150.

Volumes of the lower chamber communication chamber 149 and the upper chamber communication chamber 147 change due to the flexible disc 100 bending in the axial direction. That is, bending of the flexible disc 100 causes the lower chamber communication chamber 149 and the upper chamber communication chamber 147 to have a function of an accumulator. The lower chamber communication chamber 149 decreases in volume and discharges the oil fluid L to the lower chamber 23 to absorb an increase in volume of the upper chamber communication chamber 147, or increases in volume and allows the oil fluid L to flow in from the lower chamber 23 to absorb a decrease in volume of the upper chamber communication chamber 147. Conversely, the upper chamber communication chamber 147 decreases in volume and discharges the oil fluid L to the upper chamber 22 side to absorb an increase in volume of the lower chamber communication chamber 149, or increases in volume and allows the oil fluid L to flow in from the upper chamber 22 to absorb a decrease in volume of the lower chamber communication chamber 149.

As described above, deformation of the flexible disc 100 being hindered by the oil fluid L in the upper chamber communication chamber 147 and the lower chamber communication chamber 149 is suppressed.

The valve seat member 109 partitions the intermediate chamber 150 and the lower chamber 23. The valve seat member 109 is provided to face both the intermediate chamber 150 and the lower chamber 23. A plurality of passage grooves 225 are provided to face the lower chamber 23. The plurality of second passage parts 162 are in constant communication with the lower chamber 23 via passages in the plurality of passage grooves 225. The communication passages 148 formed in the bottom part 122 of the cap member main body 95 are in constant communication with the lower chamber 23 which is one of the upper chamber 22 and the lower chamber 23.

The radial passage 222 in the passage groove 221 that opens to the first passage parts 161 of the valve seat member 109 is in constant communication with the upper chamber communication chamber 147 via the intermediate chamber 150 and the communication passages 302 of the spring contact disc 104. The radial passage 222 allows the inside of the upper chamber communication chamber 147 to constantly communicate with the passage in the large diameter hole portion 133 of the valve seat member 109 and the piston rod passage part 51 in the passage notch part 30 of the piston rod 25.

The sub-valve 107 has a disc shape and has an outer diameter equal to an outer diameter of the valve seat part 135 of the valve seat member 109. The sub-valve 107 is in constant contact with the inner seat part 134 and can be separated from and seated on the valve seat part 135. The sub-valve 107 closes all the second passage parts 162 by being seated on the entire valve seat part 135. The sub-valve 107 is seated entirely on one of the valve seat constituent parts 201 of the valve seat part 135 to close the second passage parts 162 inside the valve seat constituent part 201. The spring member 105 brings the sub-valve 107 into contact with the valve seat part 135 of the valve seat member 109. The sub-valve 107 is seated on the valve seat part 135 by a biasing force of the spring member 105 to close the second passage parts 162.

The sub-valve 107 that can be separated from and seated on the valve seat part 135 is provided in the cap chamber 146. The sub-valve 107 allows communication between the plurality of second passage parts 162, the intermediate chamber 150, and the upper chamber communication chamber 147 by being separated from the valve seat part 135 in the cap chamber 146. As a result, the lower chamber 23 communicates with the upper chamber 22. At this time, the sub-valve 107 generates a damping force by suppressing a flow of the oil fluid L between itself and the valve seat part 135. The sub-valve 107 is an inflow valve that opens when the oil fluid L is caused to flow from the lower chamber 23 to a side of the intermediate chamber 150 and the upper chamber communication chamber 147 through the plurality of second passage parts 162. The sub-valve 107 is a check valve that restricts an outflow of the oil fluid L from the intermediate chamber 150 and the upper chamber communication chamber 147 to the lower chamber 23 via the second passage parts 162. The passage hole 216 constituting the first passage part 161 opens outside the range of the valve seat part 135 in the valve seat member 109. Therefore, the passage hole 216 is in constant communication with the intermediate chamber 150 and the upper chamber communication chamber 147 regardless of the sub-valve 107 seated on the valve seat part 135.

The passages in the plurality of passage grooves 225, the plurality of second passage parts 162, the passage between the sub-valve 107 and the valve seat part 135 that appears when the valve opens, the intermediate chamber 150, the upper chamber communication chamber 147, the radial passage 222 in the passage groove 221 of the valve seat member 109, the passage in the large diameter hole portion 133 of the valve seat member 109, the piston rod passage part 51 in the passage notch part 30 of the piston rod 25 and the passage in the large diameter hole portion 46 of the piston 21, the passage in the notch part 90 of the disc 82, and the passages in the annular groove 55 and the plurality of passage holes 38 of the piston 21 constitute a second passage 172 through which the oil fluid L flows from the lower chamber 23 on the upstream side to the upper chamber 22 on the downstream side in the cylinder 4 due to the piston 21 moving to the lower chamber 23 side. The second passage 172 serves as a compression-side passage through which the oil fluid L flows from the lower chamber 23 on the upstream side toward the upper chamber 22 on the downstream side when the piston 21 moves to the lower chamber 23 side, that is, during the compression stroke. The intermediate chamber 150 and the upper chamber communication chamber 147 are provided in the second passage 172.

The spring contact disc 104 is thicker and more rigid than the sub-valve 107. When the sub-valve 107 is deformed, the spring contact disc 104 comes into contact with the sub-valve 107 to restrict further deformation of the sub-valve 107. The sub-valve 107, the valve seat member 109 including the valve seat part 135, the cap member main body 95, the disc 106, the spring member 105, and the spring contact disc 104 constitute a second damping force generation mechanism 173. The second damping force generation mechanism 173 is provided in the compression-side second passage 172, and opens and closes the second passage 172 to suppress a flow of the oil fluid L from the second passage 172 to the upper chamber 22, thereby generating a damping force.

The second damping force generation mechanism 173 is provided in the piston rod 25. The valve seat part 135 of the second damping force generation mechanism 173 is provided in the valve seat member 109. The second damping force generation mechanism 173 is disposed separately from the first damping force generation mechanism 42 that generates a damping force in the same compression stroke. The sub-valve 107 constituting the compression-side second damping force generation mechanism 173 serves as a compression-side sub-valve. The cap member 305 covers one end side of the second damping force generation mechanism 173 and an outer circumferential side of the valve seat member 109. The cap member 305 may cover one end side of the second damping force generation mechanism 173 and at least a part of the outer circumference of the valve seat member 109.

The communication passages 148 that allow the inside and outside of the cap member 305 to communicate are formed in the bottom part 122 on one end side of the cap member 305 in the axial direction. The disc spring 116 is provided so that one end surface side in the axial direction (thickness direction) is in contact with an outer circumferential side of the cap member 305 with respect to the communication passages 148. The bendable flexible disc 100 is provided to be in contact with the other end surface side of the disc spring 116 in the axial direction (thickness direction). The disc spring 116 has a plate shape, and is formed so that an outer circumferential surface side is bent to be in contact with the flexible disc 100 and an inner circumferential surface side is bent to be in contact with the bottom part 122 of the cap member 305.

The communication passages 302 that allow the inside and outside of the cap member 305 to communicate are formed in the spring contact disc 104 that is a bottom part of the cap member 305 on the other end side in the axial direction. The disc spring 117 is provided so that one end surface side in the axial direction (thickness direction) is in contact with the outer circumferential side of the cap member 305 with respect to the communication passages 302. The bendable flexible disc 100 is provided to be in contact with the other end surface side of the disc spring 117 in the axial direction (thickness direction). That is, the disc spring 116 and the disc spring 117 are provided on both one end surface side and the other end surface side of the flexible disc 100. The disc spring 117 has a plate shape. The disc spring 117 is formed so that an outer circumferential surface side is bent to be in contact with the flexible disc 100 and an inner circumferential surface side is bent to be in contact with the spring contact disc 104 of the cap member 305.

In the second passage 172, when the second damping force generation mechanism 173 is in an open state, the passage in the notch part 90 of the disc 82 is the narrowest in portions having a fixed flow path cross-sectional area and has a smaller flow path cross-sectional area than an upstream side and a downstream side thereof, thereby serving as an orifice 175 in the second passage 172. The orifice 175 is disposed downstream of the sub-valve 107 in the flow of the oil fluid L when the sub-valve 107 opens and the oil fluid L flows through the second passage 172. The orifice 175 may be disposed upstream of the sub-valve 107 in the flow of the oil fluid L when the sub-valve 107 opens and the oil fluid L flows through the second passage 172. The orifice 175 is formed by cutting out the disc 82 of the first damping force generation mechanism 41 in contact with the piston 21.

In the compression-side second damping force generation mechanism 173, a fixed orifice that allows communication between the upper chamber 22 and the lower chamber 23 even in a state in which the valve seat part 135 and the sub-valve 107 that is in contact with the valve seat part 135 are in contact with each other is not formed in either of the valve seat part 135 and the sub-valve 107. That is, the compression-side second damping force generation mechanism 173 does not allow the upper chamber 22 and the lower chamber 23 to communicate with each other in a state in which the valve seat part 135 and the sub-valve 107 are in contact with each other over the entire circumference. In other words, the second passage 172 does not have a fixed orifice formed to allow constant communication between the upper chamber 22 and the lower chamber 23 and is not a passage that allows constant communication between the upper chamber 22 and the lower chamber 23.

The compression-side second passage 172 that allows communication between the upper chamber 22 and the lower chamber 23 is in parallel with the first passage 72 serving as a compression-side passage that similarly allows communication between the upper chamber 22 and the lower chamber 23, the first damping force generation mechanism 42 is provided in the first passage 72, and the second damping force generation mechanism 173 is provided in the second passage 172. Therefore, the first damping force generation mechanism 42 and the second damping force generation mechanism 173, which are both on the compression side, are disposed in parallel.

As illustrated in FIG. 3, the sub-valve 110 has a disc shape. The sub-valve 110 has the same outer diameter as the valve seat part 139 of the valve seat member 109. The sub-valve 110 is in constant contact with the inner seat part 138 and can be separated from and seated on the valve seat part 139. The sub-valve 110 closes all the first passage parts 161 by being seated on the entire valve seat part 139. The sub-valve 110 is seated entirely on one of the valve seat constituent parts 211 of the valve seat part 139 to close the first passage part 161 inside the valve seat constituent part 211. The sub-valve 110 can be a common part having the same shape as the sub-valve 107.

The disc 111 is a common part having the same shape as the disc 106. The disc 111 has an outer diameter smaller than the outer diameter of the sub-valve 110 and smaller than an outer diameter of the inner seat part 138.

The spring member 112 includes the base plate part 341 having a bored disc shape fitted to the mounting shaft part 28, and a plurality of spring plate parts 342 extending outward in a radial direction of the base plate part 341 from equally spaced positions of the base plate part 341 in the circumferential direction. The base plate part 341 has an outer diameter larger than the outer diameter of the disc 111. The spring plate parts 342 are each inclined with respect to the base plate part 341 to become further away from the base plate part 341 in an axial direction of the base plate part 341 toward an extended distal end side. The spring member 112 is attached to the mounting shaft part 28 so that the spring plate parts 342 extend from the base plate part 341 to the sub-valve 110 side in the axial direction of the base plate part 341. In the spring member 112, the base plate part 341 is in contact with the disc 111, and the plurality of spring plate parts 342 are in contact with the sub-valve 110. The spring member 112 brings the sub-valve 110 into contact with the valve seat part 139 of the valve seat member 109. The sub-valve 110 is seated on the valve seat part 139 by a biasing force of the spring member 112 to close the first passage parts 161.

The sub-valve 110 is provided in the lower chamber 23. The sub-valve 110 allows the upper chamber 22, the intermediate chamber 150, and the upper chamber communication chamber 147 to communicate with the lower chamber 23 by being separated from the valve seat part 139. At this time, the sub-valve 110 generates a damping force by suppressing a flow of the oil fluid L between itself and the valve seat part 139. The sub-valve 110 is a discharge valve that opens when the oil fluid L is discharged from the inside of the upper chamber 22, the intermediate chamber 150, and the upper chamber communication chamber 147 to the lower chamber 23 through the plurality of first passages 161 of the valve seat member 109. The sub-valve 110 is a check valve that restricts an inflow of the oil fluid L via the first passage parts 161 from the lower chamber 23 into the upper chamber 22, the intermediate chamber 150, and the upper chamber communication chamber 147. As illustrated in FIG. 2, the passage hole 206 constituting the second passage part 162 opens outside the range of the valve seat part 139 in the valve seat member 109. Therefore, the passage hole 206 is in constant communication with the lower chamber 23 regardless of the sub-valve 110 seated on the valve seat part 139.

The passages in the plurality of passage holes 38 and the annular groove 55 of the piston 21, the passage in the notch part 90 of the disc 82, the piston rod passage part 51 in the passage notch part 30 of the piston rod 25, the passage in the large diameter hole portion 46 of the piston 21 and the passage in the large diameter hole portion 133 of the valve seat member 109, the radial passage 222 in the passage groove 221 of the valve seat member 109, the intermediate chamber 150, the upper chamber communication chamber 147, the plurality of first passages 161 of the valve seat member 109, and the passage between the sub-valve 110 and the valve seat part 139 that appears when the valve opens constitute a second passage 182 through which the oil fluid L flows from the upper chamber 22 on the upstream side to the lower chamber 23 on the downstream side in the cylinder 4 due to the piston 21 moving to the upper chamber 22 side. The second passage 182 serves as an extension-side passage through which the oil fluid L flows from the upper chamber 22 on the upstream side toward the lower chamber 23 on the downstream side when the piston 21 moves to the upper chamber 22 side, that is, during the extension stroke.

The disc 113 has an outer diameter equal to the outer diameter of the sub-valve 110. The disc 113 is thicker and more rigid than the sub-valve 110. When the sub-valve 110 is deformed, the disc 113 comes into contact with the sub-valve 110 to restrict further deformation of the sub-valve 110. The annular member 114 has an outer diameter smaller than the outer diameter of the disc 113. The annular member 114 is a common part having the same shape as the annular member 69.

The sub-valve 110, the valve seat member 109 including the valve seat part 139, the discs 111 and 113, and the spring member 112 constitute an extension-side second damping force generation mechanism 183. The second damping force generation mechanism 183 is provided in the extension-side second passage 182, and opens and closes the second passage 182 to suppress a flow of the oil fluid L from the second passage 182 to the lower chamber 23, thereby generating a damping force. In other words, the second damping force generation mechanism 183 is provided in the piston rod 25, and the valve seat part 139 thereof is provided in the valve seat member 109. The second damping force generation mechanism 183 is disposed separately from the first damping force generation mechanism 41 that generates a damping force in the same extension stroke. The sub-valve 110 constituting the extension-side second damping force generation mechanism 183 serves as an extension-side sub-valve.

The lower chamber communication chamber 149 communicating with the lower chamber 23 via the communication passages 148 is disposed in parallel with the second passage 172 and the second passage 182. The flexible disc 100, the disc springs 116 and 117, the discs 97 to 99, and the lower chamber communication chamber 149 constitute a lower chamber volume variable mechanism 185 capable of changing a volume of the lower chamber communication chamber 149. In terms of the flow path, the lower chamber communication chamber 149 is provided between the flexible disc 100 and the sub-valve 110 via the lower chamber 23 and the communication passages 148. The flexible disc 100 changes a volume of the lower chamber communication chamber 149 to be increased by being deformed and moved away from the bottom part 122, and changes the volume of the lower chamber communication chamber 149 to be reduced by being deformed and moved closer to the bottom part 122.

The intermediate chamber 150 and the upper chamber communication chamber 147 which communicate with the upper chamber 22 constitute the second passage 172 and the second passage 182. The flexible disc 100, the disc springs 116 and 117, the discs 101 to 103, and the upper chamber communication chamber 147 constitute an upper chamber volume variable mechanism 186 capable of changing a volume of the upper chamber communication chamber 147. In terms of flow path, the upper chamber communication chamber 147 is provided between the flexible disc 100 and the sub-valve 107. The upper chamber volume variable mechanism 186 changes a volume of the upper chamber communication chamber 147 to be increased by deforming and moving the flexible disc 100 away from the spring contact disc 104, and changes the volume of the upper chamber communication chamber 147 to be reduced by deforming and moving the flexible disc 100 closer to the spring contact disc 104.

The flexible disc 100 and the disc springs 116 and 117 are commonly used for the lower chamber volume variable mechanism 185 and the upper chamber volume variable mechanism 186. The lower chamber volume variable mechanism 185 including the lower chamber communication chamber 149 and the upper chamber volume variable mechanism 186 including the upper chamber communication chamber 147 constitute an accumulator 190.

In the second passage 182, when the second damping force generation mechanism 183 is in an open state, the passage in the notch part 90 of the disc 82 is the narrowest in portions having a fixed flow path cross-sectional area and has a smaller flow path cross-sectional area than an upstream side and a downstream side thereof, thereby serving as the orifice 175 also in the second passage 182. The orifice 175 is common to the second passages 172 and 182. The orifice 175 is disposed upstream of the sub-valve 110 in the flow of the oil fluid L when the sub-valve 110 opens and the oil fluid L flows through the second passage 182. The orifice 175 may be disposed downstream of the sub-valve 110 in the flow of the oil fluid L when the sub-valve 110 opens and the oil fluid L flows through the second passage 182. The sub-valve 110 and the above-described sub-valve 107 open and close independently.

In the extension-side second damping force generation mechanism 183, a fixed orifice that allows communication between the upper chamber 22 and the lower chamber 23 even in a state in which the valve seat part 139 and the sub-valve 110 that is in contact with the valve seat part 139 are in contact with each other is not formed in either of the valve seat part 139 and the sub-valve 110. That is, the extension-side second damping force generation mechanism 183 does not allow the upper chamber 22 and the lower chamber 23 to communicate with each other if the valve seat part 139 and the sub-valve 110 are in contact with each other over the entire circumference. In other words, the second passage 182 does not have a fixed orifice formed to allow constant communication between the upper chamber 22 and the lower chamber 23 and is not a passage that allows constant communication between the upper chamber 22 and the lower chamber 23. The annular member 114, together with the disc 113, restricts deformation of the sub-valve 110 beyond a specified limit in an opening direction by coming into contact with the sub-valve 110.

In the shock absorber 1, as a flow of allowing the oil fluid L to pass in the axial direction at least within a range of the piston 21, the upper chamber 22 and the lower chamber 23 can communicate only through the first damping force generation mechanisms 41 and 42 and the second damping force generation mechanisms 173 and 183. In the shock absorber 1, a fixed orifice that allows constant communication between the upper chamber 22 and the lower chamber 23 is not provided on the passage of the oil fluid L.

The extension-side second passage 182 that allows communication between the upper chamber 22 and the lower chamber 23 is in parallel with the first passage 92 serving as an extension-side passage that similarly allows communication between the upper chamber 22 and the lower chamber 23 except for the passages in the annular groove 55 and the plurality of passage holes 38 on the upper chamber 22 side. In the portion in parallel, the first damping force generation mechanism 41 is provided in the first passage 92, and the second damping force generation mechanism 183 is provided in the second passage 182. Therefore, the first damping force generation mechanism 41 and the second damping force generation mechanism 183, which are both on the extension side, are disposed in parallel.

The second damping force generation mechanisms 173 and 183 include the valve seat member 109, the sub-valve 110 provided on one side of the valve seat member passage part 160 and the sub-valve 107 provided on the other side of the valve seat member passage part 160 which is a portion of the second passages 172 and 182 provided in the valve seat member 109, and the bottomed cylindrical cap member 305 provided between the piston 21 and the valve seat member 109 in the second passages 172 and 182. The valve seat member 109 is provided in the cap member 305. The sub-valve 110 is provided on the lower chamber 23 side of the valve seat member 109. The sub-valve 107 is provided in the cap chamber 146 between the bottom part 122 of the cap member 305 and the valve seat member 109.

In a state in which the main valve 71 is assembled to the piston rod 25, the main valve 71 is clamped by the disc 63 and the disc 67 on the inner circumferential side, and is in contact with the valve seat part 50 of the piston 21 on the outer circumferential side over the entire circumference. Also, in this state, the main valve 91 is clamped by the disc 83 and the disc 87 on the inner circumferential side, and is in contact with the valve seat part 48 of the piston 21 on the outer circumferential side over the entire circumference.

In this state, the sub-valve 107 is clamped by the inner seat part 134 of the valve seat member 109 and the disc 106 on the inner circumferential side and is in contact with the valve seat part 135 of the valve seat member 109 over the entire circumference. Also, in this state, the sub-valve 110 is clamped by the inner seat part 138 of the valve seat member 109 and the disc 111 on the inner circumferential side and is in contact with the valve seat part 139 of the valve seat member 109 over the entire circumference.

In this state, as illustrated in FIG. 3, the flexible disc 100 is clamped by the discs 99 and 101 on the inner circumferential side, and is in contact with the outer curved plate part 314 of the disc spring 116 and the outer curved plate part 314 of the disc spring 117 on the outer circumferential side over the entire circumference. Also, in this state, the inner curved plate part 312 of the disc spring 116 is in contact with the bottom part 122 of the cap member main body 95 over the entire circumference while the disc spring 116 is elastically deformed, and the inner curved plate part 312 of the disc spring 117 is in contact with the spring contact disc 104 over the entire circumference while the disc spring 117 is elastically deformed.

As illustrated in FIG. 1, a fluid passage 251 and a fluid passage 252 are formed to penetrate the valve body 12 in the axial direction. The fluid passages 251 and 252 allow communication between the lower chamber 23 and the reservoir chamber 5. The base valve 15 includes a valve mechanism 255 capable of opening and closing the fluid passage 251 with respect to the bottom member 9 side of the valve body 12 in the axial direction. The base valve 15 includes a valve mechanism 256 capable of opening and closing the fluid passage 252 with respect to a side of the valve body 12 opposite to the bottom member 9 in the axial direction.

In the base valve 15, when the piston rod 25 moves to the compression side to move the piston 21 in a direction that reduces the lower chamber 23 and a pressure in the lower chamber 23 becomes higher than a pressure in the reservoir chamber 5 by a predetermined value or higher, the valve mechanism 255 opens the fluid passage 251 to allow the oil fluid L in the lower chamber 23 to flow into the reservoir chamber 5 and generates a damping force at that time. In other words, when the piston rod 25 moves to the compression side to move the piston 21, the oil fluid L flows into the reservoir chamber 5 in the fluid passage 251. The valve mechanism 255 is a compression-side damping force generation mechanism. This valve mechanism 255 does not hinder a flow of the oil fluid L in the fluid passage 252.

In the base valve 15, when the piston rod 25 moves to the extension side to move the piston 21 to the upper chamber 22 side and a pressure in the lower chamber 23 becomes lower than a pressure in the reservoir chamber 5, the valve mechanism 256 opens the fluid passage 252 to allow the oil fluid L in the reservoir chamber 5 to flow into the lower chamber 23. In other words, when the piston rod 25 moves to the extension side to move the piston 21, the oil fluid L flows into the lower chamber 23 in the fluid passage 252. The valve mechanism 256 is a suction valve that allows the oil fluid L to flow from the reservoir chamber 5 into the lower chamber 23 without substantially generating a damping force at that time. This valve mechanism 256 does not hinder a flow of the oil fluid L in the fluid passage 251.

<Operation>

As illustrated in FIG. 2, the main valve 91 of the first damping force generation mechanism 41 has higher rigidity and a higher valve opening pressure than the sub-valve 110 of the second damping force generation mechanism 183. Therefore, in the extension stroke, in a very low speed region in which the piston speed is lower than a predetermined value, the second damping force generation mechanism 183 opens while the first damping force generation mechanism 41 is in a closed state. Also, in a normal speed region in which the piston speed is equal to or higher than the predetermined value, both the first damping force generation mechanism 41 and the second damping force generation mechanism 183 open. The sub-valve 110 is a very low speed valve that opens in a region in which the piston speed is very low to generate a damping force.

That is, in the extension stroke, a pressure of the upper chamber 22 increases and a pressure of the lower chamber 23 decreases when the piston 21 moves to the upper chamber 22 side. Then, although none of the first damping force generation mechanisms 41 and 42 and the second damping force generation mechanisms 173 and 183 has a fixed orifice that allows constant communication between the upper chamber 22 and the lower chamber 23, the oil fluid L in the upper chamber 22 flows to the intermediate chamber 150 via the passages in the plurality of passage holes 38 and the annular groove 55 of the piston 21, the orifice 175, the passage in the large diameter hole portion 46 of the piston 21, the piston rod passage part 51 in the passage notch part 30 of the piston rod 25 and the passage in the large diameter hole portion 133 of the valve seat member 109, and the radial passage 222 in the passage groove 221 of the valve seat member 109, and then flows into the upper chamber communication chamber 147 via the communication passage 302 of the spring contact disc 104. Thereby, the upper chamber communication chamber 147 rises in pressure. Therefore, in the upper chamber volume variable mechanism 186, a portion of the flexible disc 100 on a radially inner side of a position in contact with the outer curved plate part 314 of the disc spring 116 bends to the bottom part 122 side to increase a volume of the upper chamber communication chamber 147. Thereby, the upper chamber volume variable mechanism 186 suppresses a pressure rise in the upper chamber communication chamber 147. At this time, since the flexible disc 100 bends and moves to the bottom part 122 side, the lower chamber volume variable mechanism 185 reduces a volume of the lower chamber communication chamber 149.

Here, in the extension stroke of the shock absorber 1 at the time of a low-frequency input (at the time of a large amplitude of vibration), since an amount of the oil fluid L flowing from the upper chamber 22 to the upper chamber communication chamber 147 as described above becomes large, the flexible disc 100 is greatly deformed. If an amount of deformation of the flexible disc 100 becomes large, a reaction force due to support stiffness of the clamped inner circumferential side increases, and the amount of deformation is restricted. Thereby, the intermediate chamber 150 and the upper chamber communication chamber 147 rise in pressure. As a result, the second passage 182 rises in pressure until reaching a state in which the second damping force generation mechanism 183 opens.

At this time, since none of the first damping force generation mechanisms 41 and 42 and the second damping force generation mechanisms 173 and 183 has a fixed orifice that allows constant communication between the upper chamber 22 and the lower chamber 23, in the extension stroke having a piston speed lower than a first predetermined value at which the second damping force generation mechanism 183 opens, the damping force rises sharply. Also, in a very low speed region in which the piston speed is in a region higher than the first predetermined value and is lower than a second predetermined value that is a higher speed than the first predetermined value, the second damping force generation mechanism 183 opens while the first damping force generation mechanism 41 is in a closed state.

That is, the sub-valve 110 is separated from the valve seat part 139 to allow the upper chamber 22 and the lower chamber 23 to communicate with each other through the extension-side second passage 182. Therefore, the oil fluid L in the upper chamber 22 flows to the lower chamber 23 through the passages in the plurality of passage holes 38 and the annular groove 55 of the piston 21, the orifice 175, the passage in the large diameter hole portion 46 of the piston 21, the piston rod passage part 51 in the passage notch part 30 of the piston rod 25 and the passage in the large diameter hole portion 133 of the valve seat member 109, the radial passage 222 in the passage groove 221 of the valve seat member 109, the intermediate chamber 150, the first passage part 161 in the valve seat member 109, and the passage between the sub-valve 110 and the valve seat part 139.

Thereby, even in the very low speed region in which the piston speed is lower than the second predetermined value, a damping force due to valve characteristics (characteristics in which a damping force is substantially proportional to a piston speed) can be obtained.

In the extension stroke, in a normal speed region in which the piston speed is equal to or higher than the second predetermined value, the first damping force generation mechanism 41 opens while the second damping force generation mechanism 183 remains in an open state. That is, the sub-valve 110 is separated from the valve seat part 139 as described above to allow the oil fluid L to flow from the upper chamber 22 to the lower chamber 23 through the extension-side second passage 182. At this time, when the flow of the oil fluid L is reduced by the orifice 175 provided downstream of the sub-valve 91 in the second passage 182, a pressure applied to the main valve 91 becomes high to increase a differential pressure, and the main valve 91 is separated from the valve seat part 48 to allow the oil fluid L to flow from the upper chamber 22 to the lower chamber 23 through the extension-side first passage 92. Therefore, the oil fluid L in the upper chamber 22 flows to the lower chamber 23 through the passages in the plurality of passage holes 38 and the annular groove 55, and the passage between the main valve 91 and the valve seat part 48.

Thereby, even in the normal speed region in which the piston speed is equal to or higher than the second predetermined value, a damping force due to valve characteristics (a damping force is substantially proportional to a piston speed) can be obtained. A rate of increase in the extension-side damping force with respect to an increase in the piston speed in the normal speed region is lower than a rate of increase in the extension-side damping force with respect to an increase in the piston speed in the very low speed region. In other words, a slope of the rate of increase in the extension-side damping force with respect to the increase in piston speed in the normal speed region can be laid down more than that in the very low speed region.

Here, in the extension stroke, in the normal speed region in which the piston speed is equal to or higher than the second predetermined value, a differential pressure between the upper chamber 22 and the lower chamber 23 is larger than that in the low speed region in which the piston speed is equal to or higher than the first predetermined value and lower than the second predetermined value, but since the first passage 92 is not narrowed by an orifice, the oil fluid L can be allowed to flow at a high flow rate through the first passage 92 when the main valve 91 opens. In addition to this, when the second passage 182 is narrowed by the orifice 175, deformation of the sub-valve 110 can be suppressed.

Also, at this time, the sub-valve 107 in a closed state receives a pressure in an opposite direction from the lower chamber 23 and the intermediate chamber 150. Even if the differential pressure between the upper chamber 22 and the lower chamber 23 increases, since the orifice 175 is formed upstream of the sub-valve 107 in the second passage 182, a pressure rise in the intermediate chamber 150 becomes gentle with respect to a pressure rise in the upper chamber 22, and the pressure difference between the intermediate chamber 150 and the lower chamber 23 is inhibited from increasing. Therefore, the pressure difference between the intermediate chamber 150 and the lower chamber 23 received by the sub-valve 107 in a closed state is inhibited from increasing, and a large back pressure from the intermediate chamber 150 side toward the lower chamber 23 side can be inhibited from being applied to the sub-valve 107.

In the shock absorber 1, the flow path for allowing the oil fluid L to flow from the upper chamber 22 to the lower chamber 23 in the extension stroke is provided in parallel by the first passage 92 and the second passage 182, and the main valve 91 and the sub-valve 110 are provided in parallel. Also, the orifice 175 is connected in series to the sub-valve 110.

As described above, in the extension stroke, in the normal speed region in which the piston speed is equal to or higher than the second predetermined value, the oil fluid L can be allowed to flow at a high flow rate through the first passage 92 when the main valve 91 opens. Thereby, a flow rate flowing through the passage between the sub-valve 110 and the valve seat part 139 is reduced. Therefore, for example, a rate of increase in damping force with respect to increase in the piston speed when the piston speed is in the normal speed region (equal to or higher than the second predetermined value) can be reduced. In other words, a slope of the rate of increase in the extension-side damping force with respect to the increase in the piston speed in the normal speed region (equal to or higher than the second predetermined value) can be laid down more than that in the very low speed region (lower than the second predetermined value). Thereby, the degree of freedom in design can be increased.

In the extension stroke at the time of a high-frequency input (at the time of a small amplitude of vibration) in which a frequency higher than that at the time of the low-frequency input described above is input to the shock absorber 1, an amount of the oil fluid L flowing from the upper chamber 22 to the upper chamber communication chamber 147 via the intermediate chamber 150 is small. Therefore, deformation of the flexible disc 100 is small, the upper chamber volume variable mechanism 186 can absorb a volume of the oil fluid L flowing into the upper chamber communication chamber 147 by an amount of bending of the flexible disc 100, and a pressure rise in the upper chamber communication chamber 147 is reduced. Therefore, when the very low speed damping force rises, it is as if there is no flexible disc 100 and can be made in a state in which the upper chamber communication chamber 147 is in constant communication with the lower chamber 23 through the communication passage 148 of the cap member main body 95, that is, the same state as a structure without the second damping force generation mechanism 183.

Therefore, in the extension stroke at the time of the high-frequency input, the rise of the very low speed damping force becomes gentler relative to damping force characteristics at the time of the low-frequency input. Also, in the extension stroke, in the very low speed region (lower than the second predetermined value), since the flexible disc 100 bends to open the second damping force generation mechanism 183 while increasing a volume of the oil fluid L flowing into the upper chamber communication chamber 147, the very low speed damping force for the same piston speed has a characteristic in which it is lowered than that at the time of the low-frequency input in which the flexible disc 100 is fully bent and the volume of the oil fluid L flowing into the upper chamber communication chamber 147 remains unchanged. In other words, when a frequency of the piston 21 exceeds a predetermined frequency in the extension stroke, a flow rate of the oil fluid L to the sub-valve 110 of the second damping force generation mechanism 183 is restricted by the upper chamber volume variable mechanism 186 including the flexible disc 100. Further, a change in damping force (inclination of a damping force with respect to a piston speed) until the second damping force generation mechanism 183 opens can be adjusted by a difference in rigidity (plate thickness or the like) of the flexible disc 100.

The main valve 71 of the first damping force generation mechanism 42 has higher rigidity and a higher valve opening pressure than the sub-valve 107 of the second damping force generation mechanism 173. Therefore, in the compression stroke, in the very low speed region in which the piston speed is lower than the predetermined value, the second damping force generation mechanism 173 opens while the first damping force generation mechanism 42 is in a closed state. In the normal speed region in which the piston speed is equal to or higher than the predetermined value, both the first damping force generation mechanism 42 and the second damping force generation mechanism 173 open. The sub-valve 107 is a very low speed valve that opens in a region in which the piston speed is very low to generate a damping force.

That is, in the compression stroke, a pressure in the lower chamber 23 increases and a pressure in the upper chamber 22 decreases when the piston 21 moves to the lower chamber 23 side. Then, although none of the first damping force generation mechanisms 41 and 42 and the second damping force generation mechanisms 173 and 183 has a fixed orifice that allows constant communication between the lower chamber 23 and the upper chamber 22, the oil fluid L in the lower chamber 23 flows into the lower chamber communication chamber 149 through the communication passages 148 of the cap member main body 95. Thereby, the lower chamber communication chamber 149 rises in pressure. Therefore, in the lower chamber volume variable mechanism 185, a portion of the flexible disc 100 on a radially inner side of a position in contact with the outer curved plate part 314 of the disc spring 117 bends to the spring contact disc 104 side to increase a volume of the lower chamber communication chamber 149. Thereby, the lower chamber volume variable mechanism 185 suppresses a pressure rise in the lower chamber communication chamber 149. At this time, since the flexible disc 100 bends and moves to the spring contact disc 104 side, the upper chamber volume variable mechanism 186 reduces a volume of the upper chamber communication chamber 147.

Here, in the compression stroke of the shock absorber 1 at the time of the low-frequency input (at the time of a large amplitude of vibration), since an amount of the oil fluid L flowing from the lower chamber 23 to the lower chamber communication chamber 149 as described above becomes large, the flexible disc 100 is greatly deformed. If an amount of deformation of the flexible disc 100 becomes large, a reaction force due to support stiffness of the clamped inner circumferential side increases to restrict the amount of deformation, and the lower chamber communication chamber 149 rises in pressure. As a result, the second passage 172 rises in pressure until reaching a state in which the second damping force generation mechanism 173 opens.

At this time, since none of the first damping force generation mechanisms 41 and 42 and the second damping force generation mechanisms 173 and 183 has a fixed orifice that allows constant communication between the lower chamber 23 and the upper chamber 22, a damping force rises sharply in the compression stroke in which the piston speed is lower than a third predetermined value at which the second damping force generation mechanism 173 opens. Also, in a very low speed region in which the piston speed is in a region higher than the third predetermined value and is lower than a fourth predetermined value that is a higher speed than the third predetermined value, the second damping force generation mechanism 173 opens while the first damping force generation mechanism 42 is in a closed state.

That is, the sub-valve 107 is separated from the valve seat part 135 to allow communication between the lower chamber 23 and the upper chamber 22 through the compression-side second passage 172. Therefore, the oil fluid L in the lower chamber 23 flows to the upper chamber 22 through the second passage part 162 in the valve seat member 109, the passage between the sub-valve 107 and the valve seat part 135, the intermediate chamber 150 and the upper chamber communication chamber 147, the radial passage 222 in the passage groove 221 of the valve seat member 109, the passage in the large diameter hole portion 133 of the valve seat member 109, the piston rod passage part 51 in the passage notch part 30 of the piston rod 25, the passage in the large diameter hole portion 46 of the piston 21, the orifice 175, and the passages in the plurality of passage holes 38 and the annular groove 55 of the piston 21. Thereby, even in the very low speed region in which the piston speed is lower than the fourth predetermined value, a damping force due to valve characteristics (characteristics in which a damping force is substantially proportional to a piston speed) can be obtained.

Also, in the compression stroke, in a normal speed region in which the piston speed is equal to or higher than the fourth predetermined value, the first damping force generation mechanism 42 opens while the second damping force generation mechanism 173 remains in an open state. That is, the sub-valve 107 is separated from the valve seat part 135 to allow the oil fluid L to flow from the lower chamber 23 to the upper chamber 22 through the compression-side second passage 172. At this time, when the flow of the oil fluid L is reduced by the orifice 175 provided downstream of the sub-valve 107 in the second passage 172, a pressure applied to the main valve 71 becomes high to increase a differential pressure, and the main valve 71 is separated from the valve seat part 50 to allow the oil fluid L to flow from the lower chamber 23 to the upper chamber 22 through the compression-side first passage 72. Therefore, the oil fluid L in the lower chamber 23 flows to the upper chamber 22 through the passages in the plurality of passage holes 39 and the annular groove 56 and the passage between the main valve 71 and the valve seat part 50.

Thereby, even in the normal speed region in which the piston speed is equal to or higher than the fourth predetermined value, a damping force due to valve characteristics (a damping force is substantially proportional to a piston speed) can be obtained. A rate of increase in the compression-side damping force with respect to an increase in the piston speed in the normal speed region is lower than a rate of increase in the compression-side damping force with respect to an increase in the piston speed in the very low speed region. In other words, a slope of the rate of increase in the extension-side damping force with respect to the increase in the piston speed in the normal speed region can be laid down more than that in the very low speed region.

Here, in the compression stroke, in the normal speed region in which the piston speed is equal to or higher than the fourth predetermined value, a differential pressure between the lower chamber 23 and the upper chamber 22 is larger than that in the low speed region in which the piston speed is equal to or higher than the third predetermined value and lower than the fourth predetermined value, but since the first passage 72 is not narrowed by an orifice, the oil fluid L can be allowed to flow at a high flow rate through the first passage 72 when the main valve 71 opens. In addition to this, when the second passage 172 is narrowed by the orifice 175, deformation of the sub-valve 107 can be suppressed.

At this time, the sub-valve 110 in a closed state receives a pressure in an opposite direction from the lower chamber 23 and the intermediate chamber 150. Even if the differential pressure between the lower chamber 23 and the upper chamber 22 increases, since the orifice 175 is formed downstream of the sub-valve 110 in the second passage 172, a pressure rise in the intermediate chamber 150 becomes gentle with respect to a pressure rise in the lower chamber 23, and the pressure difference between the lower chamber 23 and the intermediate chamber 150 is inhibited from increasing. Therefore, the pressure difference between the lower chamber 23 and the intermediate chamber 150 received by the sub-valve 110 in a closed state is inhibited from increasing, and a large back pressure from the lower chamber 23 side toward the intermediate chamber 150 side can be inhibited from being applied to the sub-valve 110.

In the shock absorber 1, the flow path for allowing the oil fluid L to flow from the lower chamber 23 to the upper chamber 22 in the compression stroke is provided in parallel by the first passage 72 and the second passage 172, and the main valve 71 and the sub-valve 107 are provided in parallel. Also, the orifice 175 is connected in series to the sub-valve 107.

As described above, in the compression stroke, in the normal speed region in which the piston speed is equal to or higher than the fourth predetermined value, the oil fluid L can be allowed to flow at a high flow rate through the first passage 72 when the main valve 71 opens. Thereby, a flow rate flowing through the passage between the sub-valve 107 and the valve seat part 135 is reduced. Therefore, for example, reducing a rate of increase in damping force with respect to increase in the piston speed when the piston speed is in the normal speed region (equal to or higher than the fourth predetermined value) or the like is possible. In other words, a slope of the rate of increase in the compression-side damping force with respect to the increase in piston speed in the normal speed region (equal to or higher than the fourth predetermined value) can be laid down more than that in the very low speed region (lower than the fourth predetermined value). Thereby, the degree of freedom in design can be increased.

In the compression stroke at the time of the high-frequency input (at the time of a small amplitude of vibration) in which a frequency higher than that at the time of the low-frequency input described above is input to the shock absorber 1, an amount of the oil fluid L flowing from the lower chamber 23 to the lower chamber communication chamber 149 is small.

Therefore, deformation of the flexible disc 100 is small. Therefore, deformation of the flexible disc 100 is small, the lower chamber volume variable mechanism 185 can absorb a volume of the oil fluid L flowing into the lower chamber communication chamber 149 by an amount of bending of the flexible disc 100, and a pressure rise in the lower chamber communication chamber 149 is reduced. Therefore, when the very low speed damping force rises, it is as if there is no flexible disc 100 and can be made in a state in which the lower chamber communication chamber 149 is in constant communication with the upper chamber 22 through the communication passage 302 of the spring contact disc 104, that is, the same state as a structure without the second damping force generation mechanism 173.

Therefore, in the compression stroke at the time of the high-frequency input, the rise of the very low speed damping force becomes gentler relative to the damping force characteristics at the time of the low-frequency input. Also, in the compression stroke, in the very low speed region (lower than the fourth predetermined value), since the flexible disc 100 bends to open the second damping force generation mechanism 173 while increasing a volume of the oil fluid L flowing into the lower chamber communication chamber 149, the very low speed damping force for the same piston speed has a characteristic in which it is lowered than that at the time of the low-frequency input in which the flexible disc 100 is fully bent and the volume of the oil fluid L flowing into the lower chamber communication chamber 149 remains unchanged. In other words, when the frequency of the piston 21 exceeds a predetermined frequency, a flow rate of the oil fluid L to the sub-valve 107 of the second damping force generation mechanism 173 is restricted by the lower chamber volume variable mechanism 185 including the flexible disc 100. Further, a change in damping force (inclination of a damping force with respect to a piston speed) until the second damping force generation mechanism 173 opens can be adjusted by a difference in rigidity (plate thickness or the like) of the flexible disc 100.

Here, the compression stroke has characteristics in which the damping force characteristics due to the valve mechanism 255 are also combined.

Patent Document 1 described above describes a shock absorber having two valves that open in the same stroke. When a structure having two valves that open in the same stroke is employed in this way, one valve can be opened in a region of a lower piston speed than the other valve, and both valves can be opened in a region of a higher speed than that. In a shock absorber having such a structure, if a damping force is set to be generated at the time of the low-frequency input in the very low speed region particularly to improve responsiveness at the time of a slight steering input or to improve ride comfort with a feeling of flatness on a smooth road, abnormal noise may occur at the time of the high-frequency input.

In the shock absorber 1 of the first embodiment, the communication passages 148 that allow the inside and outside of the cap member 305 to communicate are formed in the bottom part 122 on one end side of the cap member 305 in the axial direction. The disc spring 116 is provided so that one end surface side in the axial direction is in contact with an outer circumferential side of the cap member 305 with respect to the communication passages 148. The bendable flexible disc 100 is provided to be in contact with the other end surface side of the disc spring 116 in the axial direction. Therefore, the lower chamber communication chamber 149 communicating with the lower chamber 23 via the communication passages 148 can be formed between the cap member 305, the flexible disc 100, and the disc spring 116. Then, the flexible disc 100 constitutes the lower chamber volume variable mechanism 185 that changes a volume of the lower chamber communication chamber 149 by deforming.

Thereby, in the compression stroke as described above, even if a damping force is set to be generated at the time of the low-frequency input in the very low speed region, a volume of the lower chamber communication chamber 149 provided in parallel with the second passage 172 can be changed by the lower chamber volume variable mechanism 185 at the time of the high-frequency input. Therefore, a flow rate of the oil fluid L flowing through the second passage 172 can be changed at the time of the high-frequency input. Therefore, in the compression stroke, even if a damping force is set to be generated at the time of the low-frequency input in the very low speed region, generation of abnormal noise during the compression stroke at the time of the high-frequency input can be suppressed.

Also, in the shock absorber 1 of the first embodiment, the communication passages 302 that allow the inside and outside of the cap member 305 to communicate are formed in the spring contact disc 104 that is a bottom part of the cap member 305 on the other end side in the axial direction. The disc spring 117 is provided so that one end surface side in the axial direction is in contact with an outer circumferential side of the cap member 305 with respect to the communication passages 302. The bendable flexible disc 100 is provided to be in contact with the other end surface side of the disc spring 117 in the axial direction. Therefore, the upper chamber communication chamber 147 communicating with the upper chamber 22 via the communication passages 302 can be formed between the cap member 305, the flexible disc 100, and the disc spring 117. Then, the flexible disc 100 constitutes the upper chamber volume variable mechanism 186 that changes a volume of the upper chamber communication chamber 147 by deforming.

Thereby, in the extension stroke as described above, even if a damping force is set to be generated at the time of the low-frequency input in the very low speed region, a volume of the upper chamber communication chamber 147 provided in the second passage 182 can be changed at the time of the high-frequency input by the upper chamber volume variable mechanism 186. Therefore, a flow rate of the oil fluid L flowing through the second passage 182 can be changed at the time of the high-frequency input. Therefore, in the extension stroke, even if a damping force is set to be generated at the time of the low-frequency input in the very low speed region, generation of abnormal noise at the time of the high-frequency input can be suppressed.

Also, the disc spring 116 and the disc spring 117 are provided on both one end surface side and the other end surface side of the flexible disc 100 in the axial direction. Therefore, the lower chamber volume variable mechanism 185 including the lower chamber communication chamber 149 and the upper chamber volume variable mechanism 186 including the upper chamber communication chamber 147 can be provided. Therefore, in both the extension stroke and the compression stroke, even if a damping force is set to be generated at the time of the low-frequency input in the very low speed region, generation of abnormal noise at the time of the high-frequency input can be suppressed as described above.

Also, the disc spring 116 has a plate shape, and is formed so that the outer curved plate part 314 on the outer circumferential surface side is bent to be in contact with the flexible disc 100 and the inner curved plate part 312 on the inner circumferential surface side is bent to be in contact with the bottom part 122 of the cap member 305. Therefore, compared to a disc spring that is in contact with the flexible disc 100 and the bottom part 122 at end portions of inner and outer circumferences thereof, leakage of the oil fluid L from the lower chamber communication chamber 149 can be suppressed. Therefore, damping force characteristics can be stabilized. That is, since the end portions of the inner and outer circumferences of the disc spring are formed by press forming, burrs, scratches, or the like are likely to occur. Therefore, the disc spring that is in contact with the flexible disc 100 and the bottom part 122 at the end portions of the inner and outer circumferences is likely to leak the oil fluid L, but since the disc spring 116 is not in contact with the flexible disc 100 and the bottom part 122 at its end portions of inner and outer circumferences, such leakage can be suppressed.

The disc spring 117 has a plate shape, and is formed so that the outer curved plate part 314 on the outer circumferential surface side is bent to be in contact with the flexible disc 100 and the inner curved plate part 312 on the inner circumferential surface side is bent to be in contact with the spring contact disc 104 of the cap member 305. Therefore, compared to a disc spring that is in contact with the flexible disc 100 and the spring contact disc 104 at end portions of inner and outer circumferences thereof, leakage of the oil fluid L from the upper chamber communication chamber 147 can be suppressed. Therefore, damping force characteristics can be stabilized.

The disc springs 116 and 117 come into contact with the cylindrical part 124 of the cap member 305 that covers the valve seat member 109 at their outer circumferential end portions. Therefore, radial displacement of the disc springs 116 and 117 with respect to the flexible disc 100 can be suppressed by the cylindrical part 124. Therefore, leakage of the oil fluid from the lower chamber communication chamber 149 due to radial displacement of the disc spring 116 with respect to the flexible disc 100, and leakage of the oil fluid from the upper chamber communication chamber 147 due to radial displacement of the disc spring 117 with respect to the flexible disc 100 can be suppressed. Therefore, damping force characteristics can be further stabilized. Also, since there is no need to provide a dedicated part for suppressing radial displacement of the disc springs 116 and 117 with respect to the flexible disc 100, the number of parts can be reduced and costs can be reduced.

Second Embodiment

Next, a second embodiment will be described mainly on the basis of FIG. 4, focusing on differences from the first embodiment. Further, parts common to those in the first embodiment are denoted by the same terms and the same reference signs.

Figure 4:
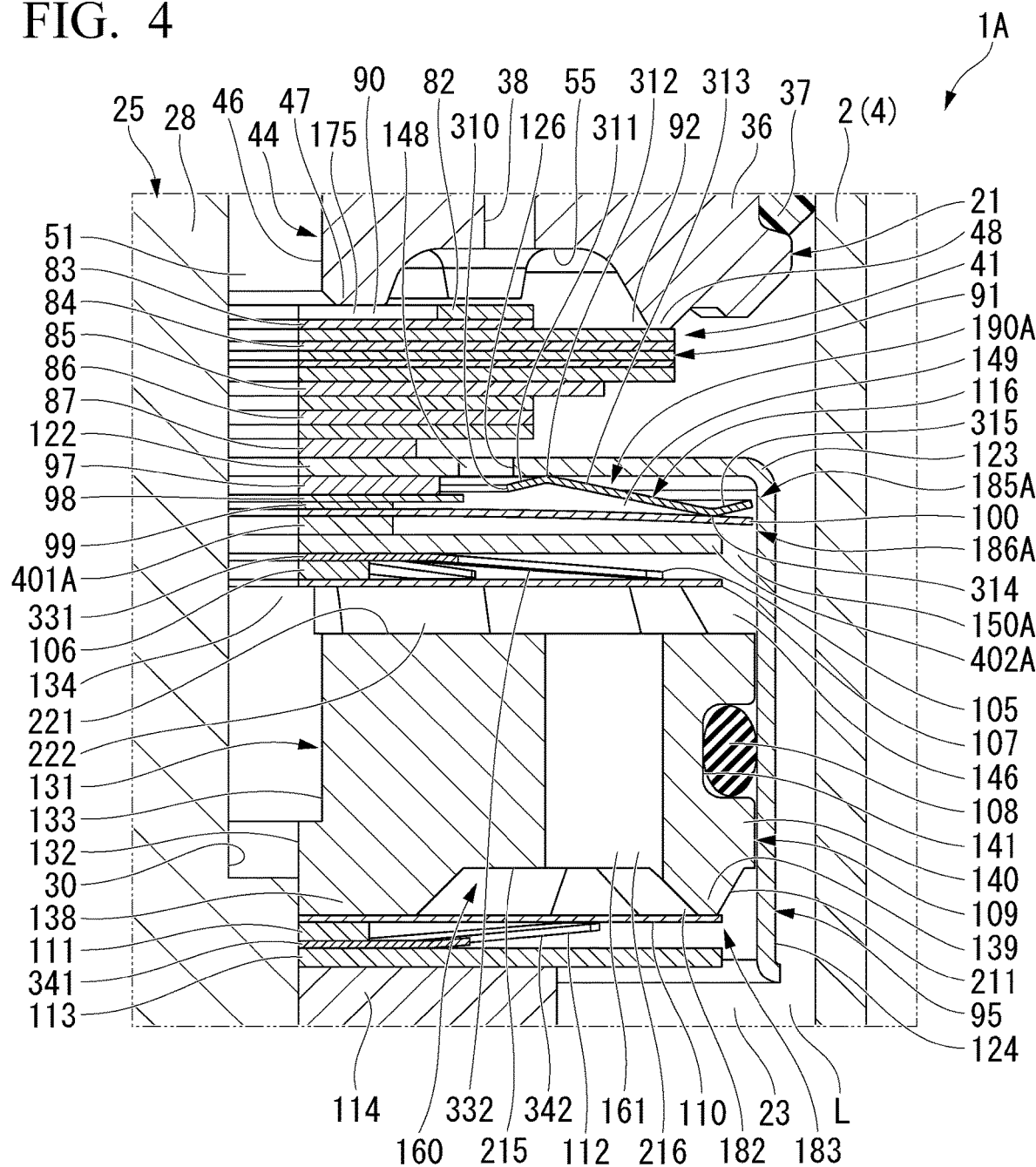
FIG. 4 is a partial cross-sectional view illustrating a main part of a shock absorber according to a second embodiment of the present invention.

In a shock absorber 1A of the second embodiment, an accumulator 190A is provided as illustrated in FIG. 4 in place of the accumulator 190 of the first embodiment. The accumulator 190A includes a disc 97, a disc 98, a disc 99, and a flexible disc 100 stacked on a cylindrical part 124 side in an axial direction of the bottom part 122 of the cap member main body 95 in order from a bottom part 122 side. Only one disc 98 is provided in the accumulator 190A. The accumulator 190A includes a disc spring 116 between the bottom part 122 and the flexible disc 100 of the cap member main body 95.

On the other hand, the accumulator 190A does not include the disc spring 117 of the first embodiment. Also, the accumulator 190A does not include the discs 101 to 103 of the first embodiment, but includes one disc 401A instead.

Further, the shock absorber 1A includes a disc 402A in place of the spring contact disc 104. In the shock absorber 1A, the cap member main body 95 serves as a cap member.

The disc 401A is in contact with the flexible disc 100 on a side of the flexible disc 100 opposite to the disc 99. The disc 401A has a bored disc shape made of a metal. The disc 401A is formed to have the same inner diameter and the same outer diameter as the disc 99, and has a thickness larger than that of the disc 99. A mounting shaft part 28 of a piston rod 25 is fitted on an inner circumferential side of the disc 401A. Thereby, the disc 401A is radially positioned with respect to the piston rod 25.

The disc 402A is in contact with the disc 401A on a side of the disc 401A opposite to the flexible disc 100. The disc 402A has a bored disc shape made of a metal. The disc 402A is formed to have the same inner diameter and the same outer diameter as a sub-valve 107. The disc 402A is formed to have a larger thickness and higher rigidity than the flexible disc 100. A spring member 105 is in contact with a base plate part 331 on a side of the disc 402A opposite to the disc 401A. The mounting shaft part 28 of the piston rod 25 is fitted on an inner circumferential side of the disc 402A. Thereby, the disc 402A is radially positioned with respect to the piston rod 25.

Also in the accumulator 190A, a lower chamber communication chamber 149 is formed by being surrounded by the flexible disc 100, the disc spring 116, the discs 97 to 99, and the bottom part 122 of the cap member main body 95. In the accumulator 190A, the flexible disc 100, the disc spring 116, the discs 97 to 99, and the lower chamber communication chamber 149 constitute a lower chamber volume variable mechanism 185A capable of changing a volume of the lower chamber communication chamber 149.

The shock absorber 1A includes an intermediate chamber 150A between the flexible disc 100 and a valve seat member 109, and the upper chamber communication chamber 147 of the first embodiment is not provided. Similarly to the intermediate chamber 150 of the first embodiment, the intermediate chamber 150A is in constant communication with a radial passage 222 and thus is in constant communication with an upper chamber 22 (see FIG. 2). In the accumulator 190A, the flexible disc 100 and the disc spring 116 constitute an upper chamber volume variable mechanism 186A that changes a volume of the upper chamber 22 (see FIG. 2) by changing a volume of the intermediate chamber 150A.

In the shock absorber 1A of the second embodiment, in an extension stroke, the flexible disc 100 constituting the upper chamber volume variable mechanism 186A deforms a portion of the disc spring 116 on a radially inner side of a portion in contact with an outer curved plate part 314 toward the bottom part 122 side, and thereby a volume of the intermediate chamber 150A is increased. Thereby, in the extension stroke, the accumulator 190A operates in substantially the same manner as in the first embodiment.

On the other hand, in the accumulator 190A, an oil fluid L enters the lower chamber communication chamber 149 of the lower chamber volume variable mechanism 185A from a lower chamber 23 through a communication passage 148 in a compression stroke.

As a pressure in the lower chamber communication chamber 149 increases, the flexible disc 100 deforms to the disc 402A side, the disc spring 116 also deforms following the deformation to keep the outer curved plate part 314 in a state of being in contact with the flexible disc 100, and thereby a volume of the lower chamber communication chamber 149 is increased. Thereby, the accumulator 190A operates in substantially the same manner as in the first embodiment also in the compression stroke.

According to the shock absorber 1A of the second embodiment, in a structure in which the accumulator 190A supports the flexible disc 100 with one disc spring 116 on one side, a damping force can be made variable according to a frequency in both an extension process and a compression process, and thereby the structure can be simplified.

Third Embodiment

Next, a third embodiment will be described mainly on the basis of FIGS. 5 and 6, focusing on differences from the first embodiment. Further, parts common to those in the first embodiment are denoted by the same terms and the same reference signs.

Figure 5:
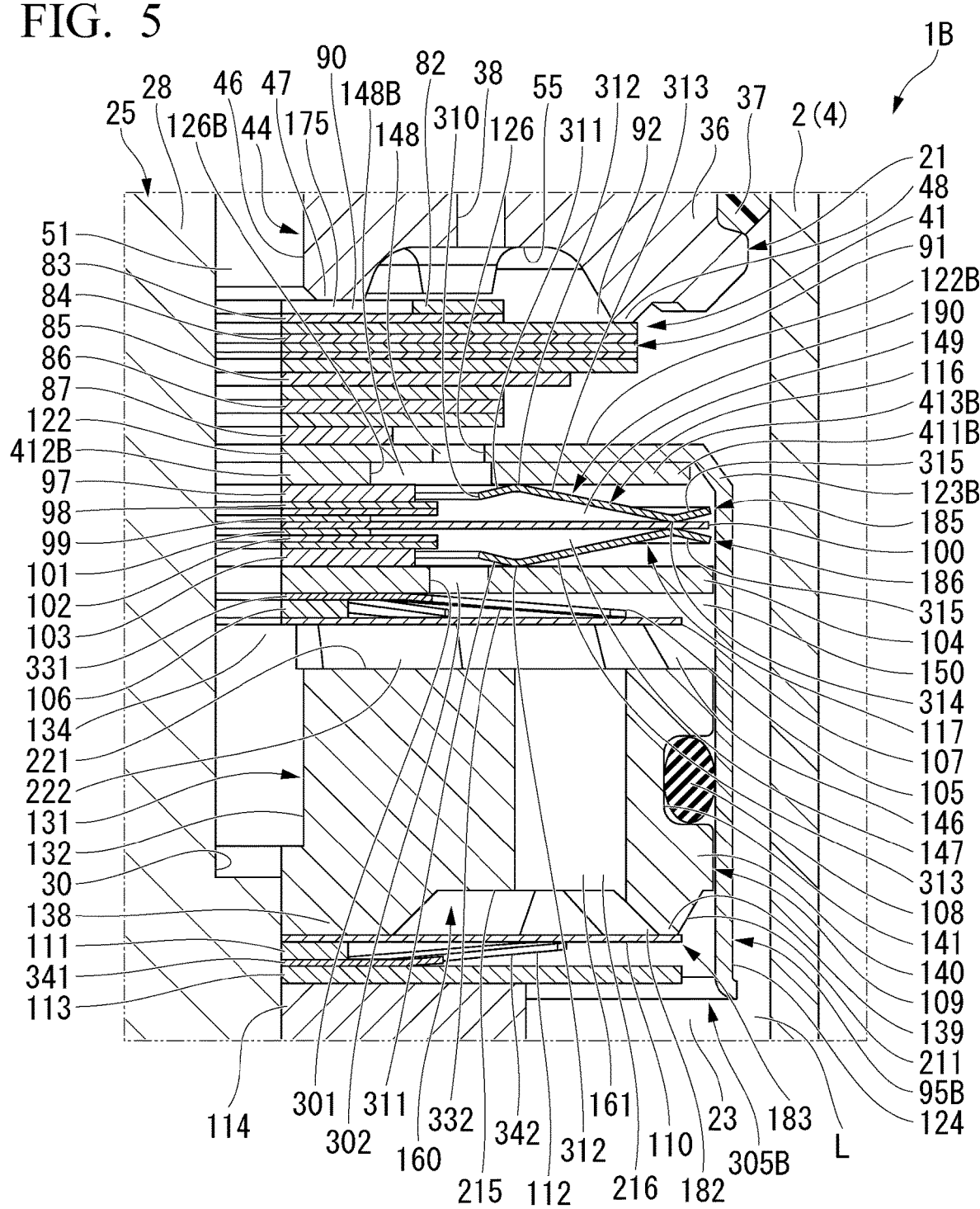
FIG. 5 is a partial cross-sectional view illustrating a main part of a shock absorber according to a third embodiment of the present invention.
Figure 6:
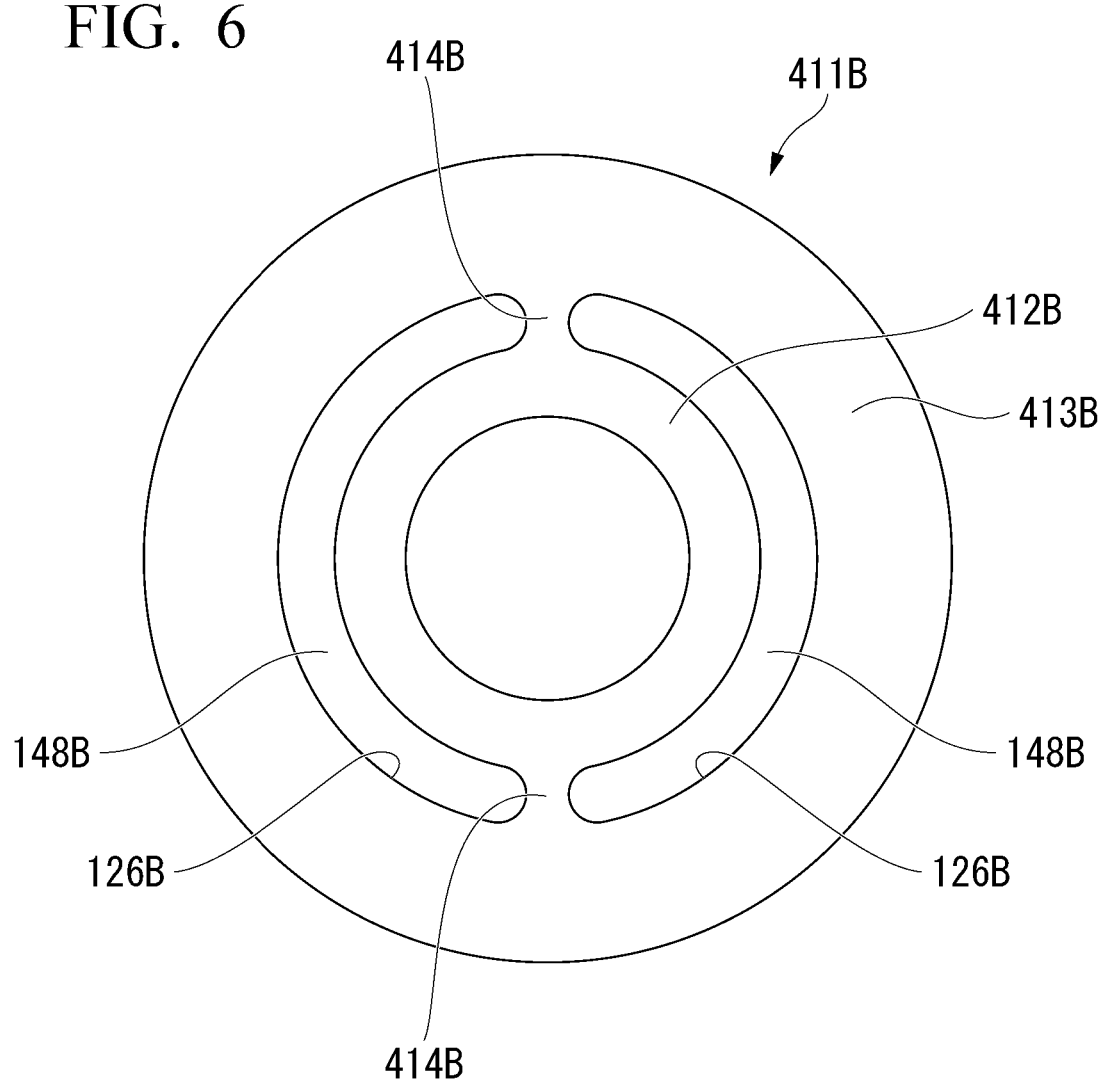
FIG. 6 is a plan view illustrating a planar disc of the shock absorber according to the third embodiment of the present invention.

In the shock absorber 1B of the third embodiment, a cap member 305B is provided as illustrated in FIG. 5 in place of the cap member 305 of the first embodiment. The cap member 305B includes a cap member main body 95B partially different from the cap member main body 95 of the first embodiment, a spring contact disc 104 similar to that of the first embodiment, and a planar disc 411B that is not provided in the first embodiment.

The cap member main body 95B includes an intermediate tapered part 123B formed between a bottom part 122 similar to that of the first embodiment and a cylindrical part 124 similar to that of the first embodiment in place of the intermediate curved part 123 of the first embodiment. The intermediate tapered part 123B has a tapered shape coaxial with the bottom part 122. The intermediate tapered part 123B extends from an outer circumferential edge portion of the bottom part 122 while a diameter thereof increases to one side of the bottom part 122 in the axial direction to be connected to the cylindrical part 124.

The planar disc 411B has a bored disc shape made of a metal. As illustrated in FIG. 6, the planar disc 411B includes an inner annular part 412B, an outer annular part 413B, and a plurality, specifically two, of connection parts 414B connecting them. The inner annular part 412B has a bored disc shape. The outer annular part 413B has a bored disc shape having an inner diameter larger than an outer diameter of the inner annular part 412B.

Both the inner annular part 412B and the outer annular part 413B have a constant width in a radial direction over the entire circumference. The outer annular part 413B has a radial width larger than a radial width of the inner annular part 412B. The inner annular part 412B and the outer annular part 413B are coaxially disposed. The two connection parts 414B connect the inner annular part 412B and the outer annular part 413B in a state in which they are coaxial. The two connection parts 414B connect an outer circumferential edge portion of the inner annular part 412B and an inner circumferential edge portion of the outer annular part 413B. The two connection parts 414B are provided to be shifted in position by 180° in a circumferential direction of the inner annular part 412B and the outer annular part 413B.

With a shape described above, the planar disc 411B includes two arcuate passage holes 126B formed to be surrounded by the inner annular part 412B, the outer annular part 413B, and the two connection parts 414B. The two passage holes 126B penetrate the planar disc 411B in a thickness direction (axial direction).

As illustrated in FIG. 5, the outer annular part 413B of the planar disc 411B has an outer diameter slightly smaller than a minimum inner diameter of the intermediate tapered part 123B of the cap member main body 95B. The planar disc 411B is disposed between the bottom part 122 of the cap member main body 95B, and the disc 97 and the disc spring 116. The planar disc 411B is provided so that one end surface in the axial direction is in contact with the bottom part 122 and the other end surface in the axial direction is in contact with the disc 97 and the disc spring 116. The planar disc 411B is axially clamped by the bottom part 122 of the cap member main body 95B and the disc 97 at the inner annular part 412B and portions of two connection parts 414B on the inner annular part 412B side.

The planar disc 411B is provided so that one end surface in the axial direction is in contact with the bottom part 122 and the other end surface in the axial direction is in contact with an inner curved plate part 312 of the disc spring 116. The planar disc 411B, together with the bottom part 122, constitutes a bottom part 122B of the cap member 305B by overlapping the bottom part 122. Thus, the bottom part 122B of the cap member 305B includes the planar disc 411B that is in contact with the disc spring 116.

The planar disc 411B is radially positioned with respect to a piston rod 25 by fitting a mounting shaft part 28 of the piston rod 25 to an inner circumferential side of the inner annular part 412B. In the planar disc 411B, a communication passage 148B in each of the passage holes 126B is in constant communication with a communication passage 148 of the bottom part 122. Therefore, the communication passage 148B is in constant communication with a lower chamber 23.

Even if the disc spring 116 moves to the maximum in the radial direction, the disc spring 116 maintains a state in which the inner curved plate part 312 is in contact with a position of the bottom part 122B on a radially outer side of all the passage holes 126B of the bottom part 122B over the entire circumference. The disc spring 116 is provided so that one end surface side in the axial direction is in contact with an outer circumferential side of the communication passage 148B of the cap member 305B.

The shock absorber 1B of the third embodiment operates in the same manner as the shock absorber 1 of the first embodiment except that the lower chamber communication chamber 149 allows an oil fluid L to flow to the lower chamber 23 via the communication passage 148B and the communication passage 148.

According to the shock absorber 1B of the third embodiment, the bottom part 122B of the cap member 305B includes the planar disc 411B that is in contact with the inner curved plate part 312 of the disc spring 116. Therefore, flatness of a portion of the bottom part 122B in contact with the disc spring 116 can be improved. Therefore, leakage of the oil fluid L from the lower chamber communication chamber 149 via a space between the disc spring 116 and the bottom part 122B can be further suppressed. Therefore, damping force characteristics can be further stabilized.

Further, it is also possible to have a structure without the disc spring 117 when the same modification as the modification of the shock absorber 1A of the second embodiment with respect to the shock absorber 1 of the first embodiment is performed for the shock absorber 1B of the third embodiment.

Fourth Embodiment

Next, a fourth embodiment will be described mainly on the basis of FIGS. 7 and 8, focusing on differences from the third embodiment. Further, parts common to those in the third embodiment are denoted by the same terms and the same reference signs.

Figure 7:
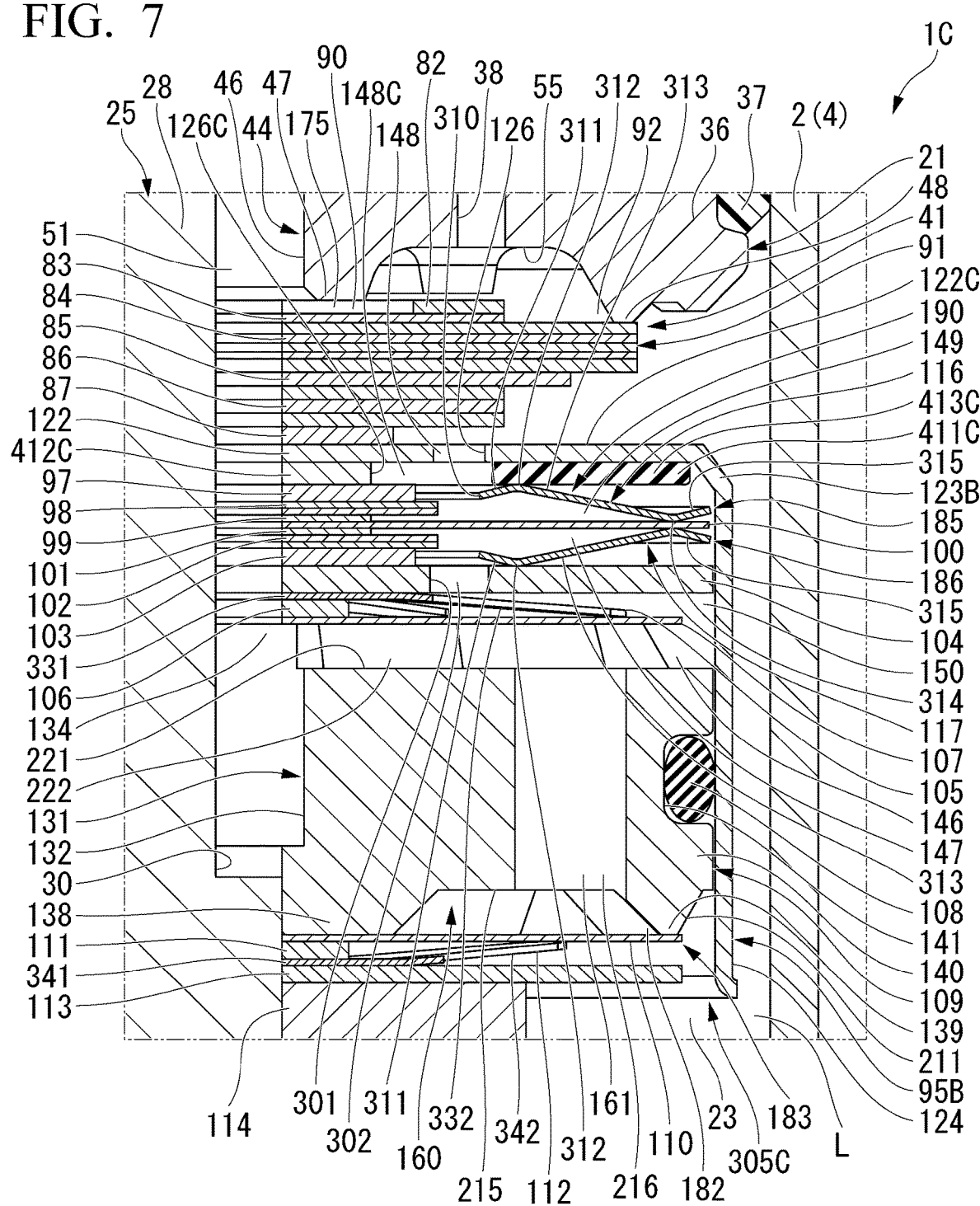
FIG. 7 is a partial cross-sectional view illustrating a main part of a shock absorber according to a fourth embodiment of the present invention.

In a shock absorber 1C of the fourth embodiment, a cap member 305C is provided as illustrated in FIG. 7 in place of the cap member 305B of the third embodiment. The cap member 305C includes a cap member main body 95B similar to that of the third embodiment and a spring contact disc 104 similar to that of the third embodiment. The cap member 305C includes a planar disc 411C in place of the planar disc 411B of the third embodiment.

Figure 8:
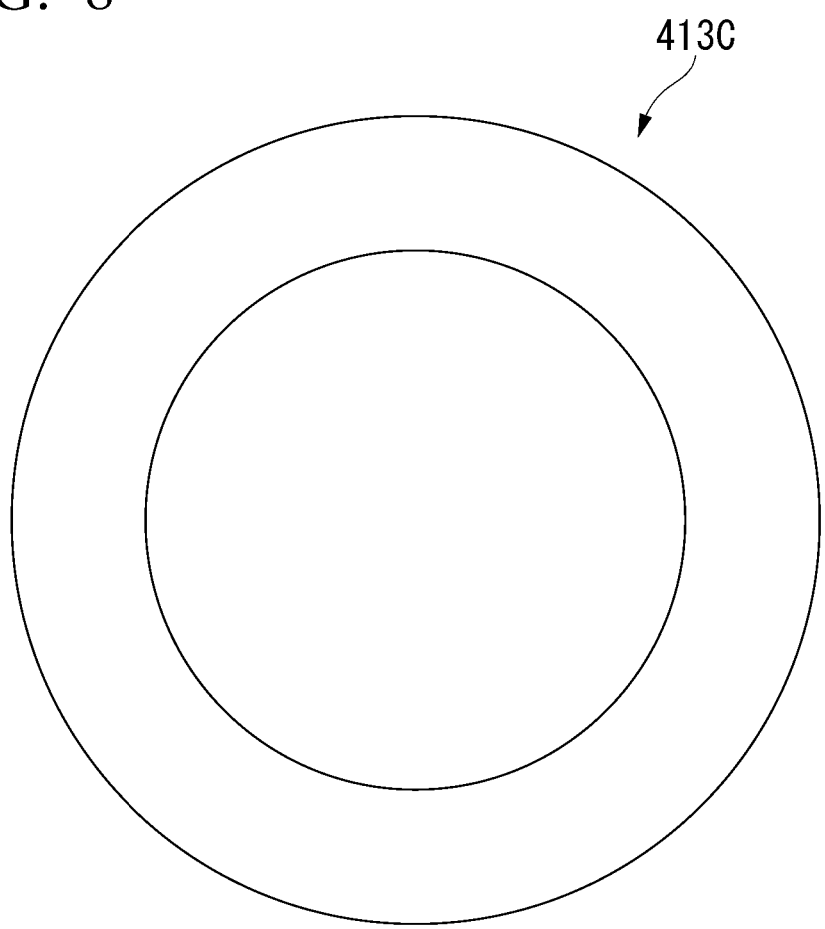
FIG. 8 is a plan view illustrating an outer disc of the shock absorber according to the fourth embodiment of the present invention.

The planar disc 411C is constituted by two parts including an inner disc 412C having a bored disc shape made of a metal, and an outer disc 413C having a bored disc shape as illustrated in FIG. 8 and formed of a rubber material having a sealing property such as nitrile rubber or fluoro-rubber. As illustrated in FIG. 7, the outer disc 413C has an inner diameter larger than an outer diameter of the inner disc 412C. Both the inner disc 412C and the outer disc 413C have a constant width in a radial direction over the entire circumference. The outer disc 413C has a radial width larger than a radial width of the inner disc 412C. The inner disc 412C and the outer disc 413C have the same thickness.

The planar disc 411C has a circular passage hole 126C between the inner disc 412C and the outer disc 413C. The passage hole 126C penetrates the planar disc 411C in a thickness direction (axial direction).

The outer diameter of the outer disc 413C of the planar disc 411C has an outer diameter slightly smaller than the minimum inner diameter of the intermediate tapered part 123B of the cap member main body 95B. The planar disc 411C is disposed between a bottom part 122 of the cap member main body 95B, and a disc 97 and a disc spring 116. The inner disc 412C is in contact with the bottom part 122 of the cap member main body 95B and the disc 97. The outer disc 413C is in contact with the bottom part 122 of the cap member main body 95B and the disc spring 116. The inner disc 412C is provided so that one end surface in the axial direction is in contact with the bottom part 122 and the other end surface in the axial direction is in contact with the disc 97. The inner disc 412C is axially clamped by the bottom part 122 of the cap member main body 95B and the disc 97. The outer disc 413C is provided so that one end surface in the axial direction is in contact with the bottom part 122 and the other end surface in the axial direction is in contact with an inner curved plate part 312 of the disc spring 116. A state of the outer disc 413C being in contact with the bottom part 122 due to a biasing force of the disc spring 116 is maintained.

The planar disc 411C, together with the bottom part 122, constitutes a bottom part 122C of the cap member 305C by the inner disc 412C and the outer disc 413C overlapping the bottom part 122. Thus, the bottom part 122C of the cap member 305C has the planar disc 411C including the outer disc 413C that is in contact with the disc spring 116.

In the planar disc 411C, the inner disc 412C is radially positioned with respect to a piston rod 25 by fitting a mounting shaft part 28 of the piston rod 25 to an inner circumferential side of the inner disc 412C. Also, in the planar disc 411C, the outer disc 413C is radially positioned with respect to the cap member main body 95C, that is, the piston rod 25, by the intermediate tapered part 123B of the cap member main body 95C. In the planar disc 411C, a communication passage 148C in the passage hole 126C is in constant communication with a communication passage 148 of the bottom part 122.

Even if the disc spring 116 moves to the maximum in the radial direction, the disc spring 116 maintains a state in which the inner curved plate part 312 is in contact with a position of the bottom part 122C on a radially outer side of the passage hole 126C of the bottom part 122C over the entire circumference. The disc spring 116 is provided so that one end surface side in the axial direction is in contact with an outer circumferential side of the communication passage 148C of the cap member 305C.

The shock absorber 1C of the fourth embodiment operates in the same manner as the shock absorber 1 of the first embodiment except that a lower chamber communication chamber 149 allows an oil fluid L to flow to the lower chamber 23 via the communication passage 148C and the communication passage 148.

According to the shock absorber 1C of the fourth embodiment, the bottom part 122C of the cap member 305C includes the outer disc 413C having a high sealing property that is in contact with the inner curved plate part 312 of the disc spring 116. Therefore, leakage of the oil fluid L from the lower chamber communication chamber 149 through a space between the disc spring 116 and the bottom part 122C can be further suppressed. Therefore, damping force characteristics can be further stabilized.

Further, it is also possible to have a structure without the disc spring 117 when the same modification as the modification of the shock absorber 1A of the second embodiment with respect to the shock absorber 1 of the first embodiment is performed for the shock absorber 1C of the fourth embodiment.

Fifth Embodiment

Next, a fifth embodiment will be described mainly on the basis of FIGS. 9 and 10, focusing on differences from the first embodiment. Further, parts common to those in the first embodiment are denoted by the same terms and the same reference signs.

Figure 9:
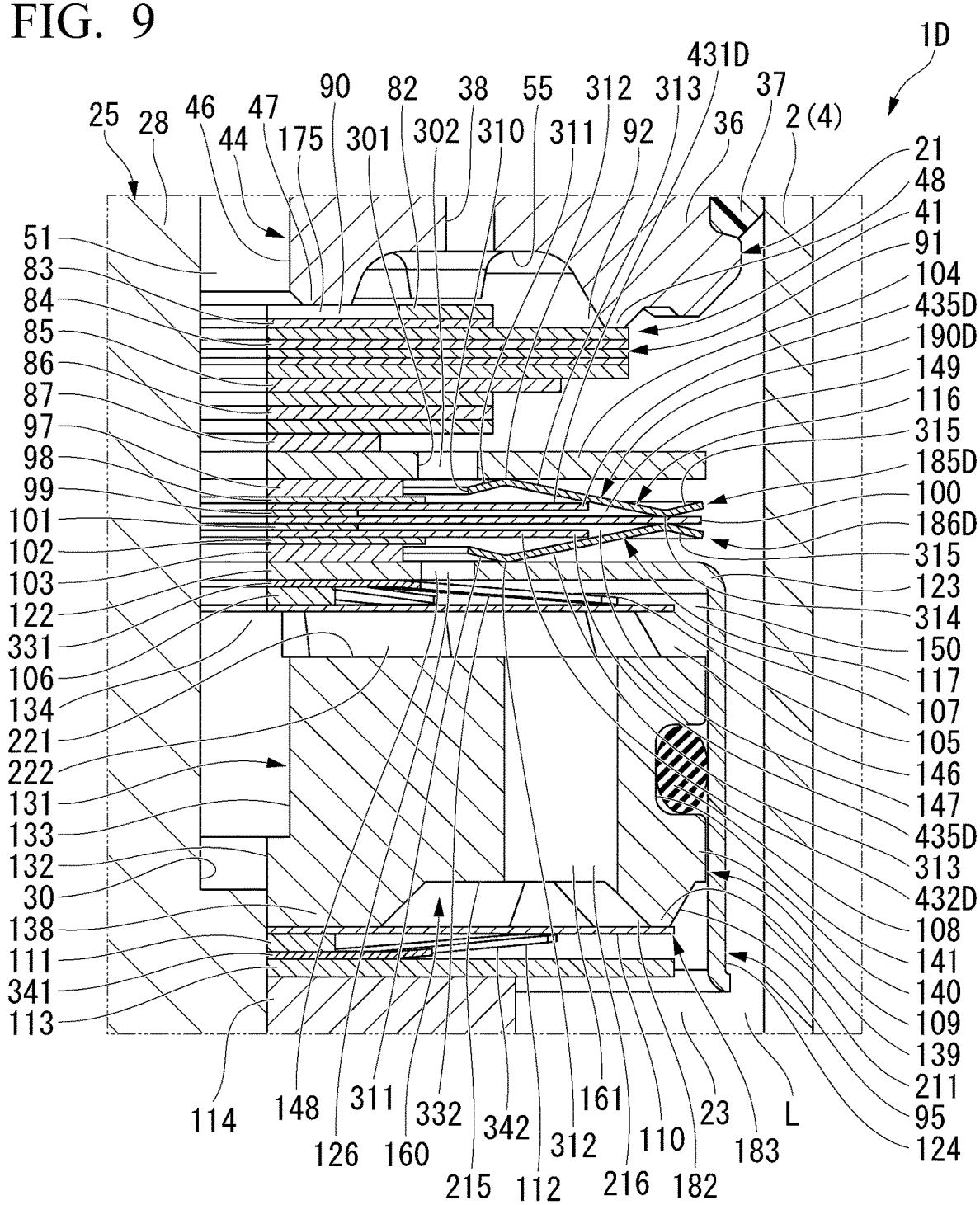
FIG. 9 is a partial cross-sectional view illustrating a main part of a shock absorber according to a fifth embodiment of the present invention.
Figure 10:
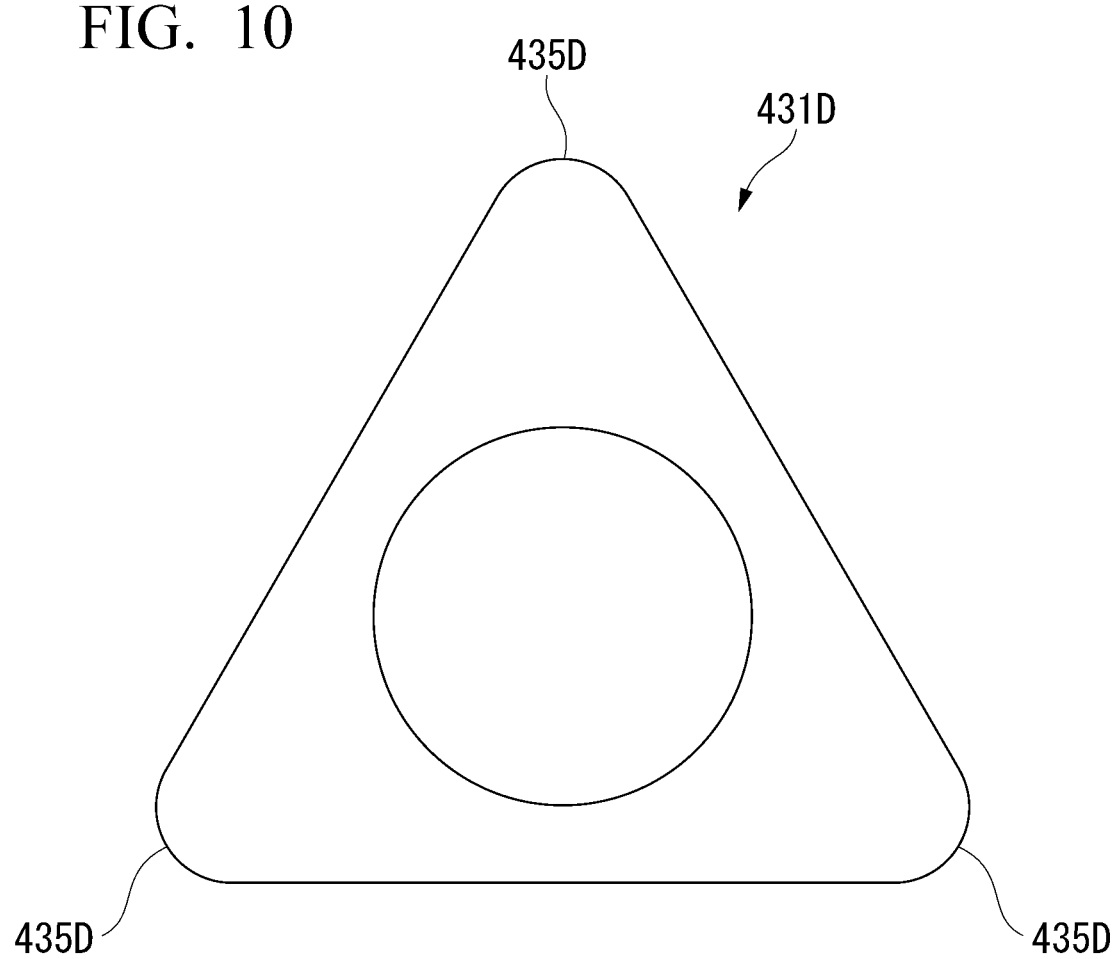
FIG. 10 is a plan view illustrating a guide member of the shock absorber according to the fifth embodiment of the present invention.

In a shock absorber 1D of the fifth embodiment, an accumulator 190D is provided as illustrated in FIG. 9 in place of the accumulator 190 of the first embodiment. The accumulator 190D is not provided inside a cap member main body 95, but is provided outside the cap member main body 95. Also, in the shock absorber 1D, a spring contact disc 104 similar to that of the first embodiment also is not provided inside a cap member main body 95, but is provided outside the cap member main body 95. The accumulator 190D and the spring contact disc 104 are provided between the bottom part 122 of the cap member main body 95 and a disc 87. In the shock absorber 1D, the cap member main body 95 serves as a cap member.

In the shock absorber 1D, the spring contact disc 104 is in contact with the disc 87 on a side opposite to a disc 86. The accumulator 190D is provided on a side of the spring contact disc 104 opposite to the disc 87. The accumulator 190D includes a disc 97, a disc 98, a guide member 431D, a disc 99, a flexible disc 100, a disc 101, a guide member 432D, a disc 102, and a disc 103 in order from the spring contact disc 104 side. Then, in the accumulator 190D, a side of the disc 103 opposite to the disc 102 is in contact with the bottom part 122 of the cap member main body 95.

The accumulator 190D includes a disc spring 116 disposed between the spring contact disc 104 and the flexible disc 100, and a disc spring 117 disposed between the flexible disc 100 and the bottom part 122 of the cap member main body 95.

The guide member 431D has a flat plate shape made of a metal. As illustrated in FIG. 10, the guide member 431D has a substantially equilateral triangular shape with a hole formed in a center thereof. The guide member 431D has an arcuate guide part 435D at a position of each vertex of the triangle at the outer circumferential portion. The guide member 431D includes three guide parts 435D at regular intervals in a circumferential direction.

As illustrated in FIG. 9, the guide member 431D is radially positioned with respect to a piston rod 25 by fitting a mounting shaft part 28 of the piston rod 25 to an inner circumferential side of the guide member 431D. In this state, the inner circumferential side of the guide member 431D is axially clamped by the disc 98 and the disc 99. Three guide parts 435D of the guide member 431D are in contact with an inner circumferential side of an intermediate tapered plate part 313 of the disc spring 116 from a radially inner side at the same time. Thereby, the disc spring 116 is radially positioned with respect to the piston rod 25.

The guide member 432D is a common part having the same shape as the guide member 431D. The guide member 432D is also radially positioned with respect to the piston rod 25 by fitting the mounting shaft part 28 of the piston rod 25 to an inner circumferential side of the guide member 432D. In this state, the guide member 432D is axially clamped by the disc 101 and the disc 102. Three guide parts 435D of the guide member 432D are in contact with an inner circumferential side of the intermediate tapered plate part 313 of the disc spring 117 from a radially inner side at the same time. Thereby, the disc spring 117 is radially positioned with respect to the piston rod 25.

In the shock absorber 1D, a lower chamber communication chamber 149 is formed by being surrounded by the flexible disc 100, the disc spring 116, the discs 97 to 99, the guide member 431D, and the spring contact disc 104. The lower chamber communication chamber 149 communicates with a lower chamber 23 via a communication passage 302 of the spring contact disc 104.

The guide member 431D is disposed between the disc spring 116 and the flexible disc 100. The guide member 431D is provided inside the lower chamber communication chamber 149. The flexible disc 100, the disc springs 116 and 117, the discs 97 to 99, the guide member 431D, and the lower chamber communication chamber 149 constitute a lower chamber volume variable mechanism 185D capable of changing a volume of the lower chamber communication chamber 149.

In the shock absorber 1D, an upper chamber communication chamber 147 is formed by being surrounded by the flexible disc 100, the disc spring 117, the discs 101 to 103, the guide member 432D, and the bottom part 122 of the cap member main body 95.

In the shock absorber 1D, the accumulator 190D and the spring contact disc 104 are provided outside the cap member main body 95. Therefore, a spring member 105 is in contact with a base plate part 331 on an end surface in the axial direction of the bottom part 122 of the cap member main body 95 on a cylindrical part 124 side.

In the shock absorber 1D, a space between the bottom part 122 and a valve seat member 109 of the cap member main body 95 is an intermediate chamber 150 that is in constant communication with a radial passage 222. The upper chamber communication chamber 147 is in constant communication with the intermediate chamber 150 via a communication passage 148 of the bottom part 122 of the cap member main body 95. Therefore, the upper chamber communication chamber 147 is in constant communication with an upper chamber 22 (see FIG. 2).

The guide member 432D is disposed between the disc spring 117 and the flexible disc 100 and provided inside the upper chamber communication chamber 147. The flexible disc 100, the disc springs 116 and 117, the discs 101 to 103, the guide member 432D, and the upper chamber communication chamber 147 constitute an upper chamber volume variable mechanism 186D capable of changing a volume of the upper chamber communication chamber 147.

In the shock absorber 1D of the fifth embodiment, in an extension stroke, the flexible disc 100 constituting the upper chamber volume variable mechanism 186D deforms a portion of the disc spring 116 on a radially inner side of a portion in contact with an outer curved plate part 314 toward the spring contact disc 104 side to increase a volume of the upper chamber communication chamber 147. Also, in a compression stroke, the flexible disc 100 constituting the lower chamber volume variable mechanism 185D deforms a portion of the disc spring 117 on a radially inner side of a portion in contact with the outer curved plate part 314 toward the bottom part 122 side of the cap member main body 95 to increase a volume of the lower chamber communication chamber 149. Thereby, the accumulator 190D operates in the same manner as in the first embodiment.

According to the shock absorber 1D of the fifth embodiment, the guide member 431D is provided between the disc spring 116 and the flexible disc 100 to be in contact with an inner circumferential side of the disc spring 116, and the guide member 432D is provided between the disc spring 117 and the flexible disc 100 to be in contact with an inner circumferential side of the disc spring 117. Therefore, radial displacement of the disc springs 116 and 117 with respect to the flexible disc 100 can be suppressed by the guide members 431D and 432D. Therefore, leakage of the oil fluid from the lower chamber communication chamber 149 due to radial displacement of the disc spring 116 with respect to the flexible disc 100, and leakage of the oil fluid from the upper chamber communication chamber 147 due to radial displacement of the disc spring 117 with respect to the flexible disc 100 can be suppressed. Therefore, damping force characteristics can be further stabilized.

Further, it is also possible to have a structure without the disc spring 117 when the same modification as the modification of the shock absorber 1A of the second embodiment with respect to the shock absorber 1 of the first embodiment is performed for the shock absorber 1D of the fifth embodiment.

Sixth Embodiment

Next, a sixth embodiment will be described mainly on the basis of FIG. 11, focusing on differences from the first embodiment. Further, parts common to those in the first embodiment are denoted by the same terms and the same reference signs.

Figure 11:
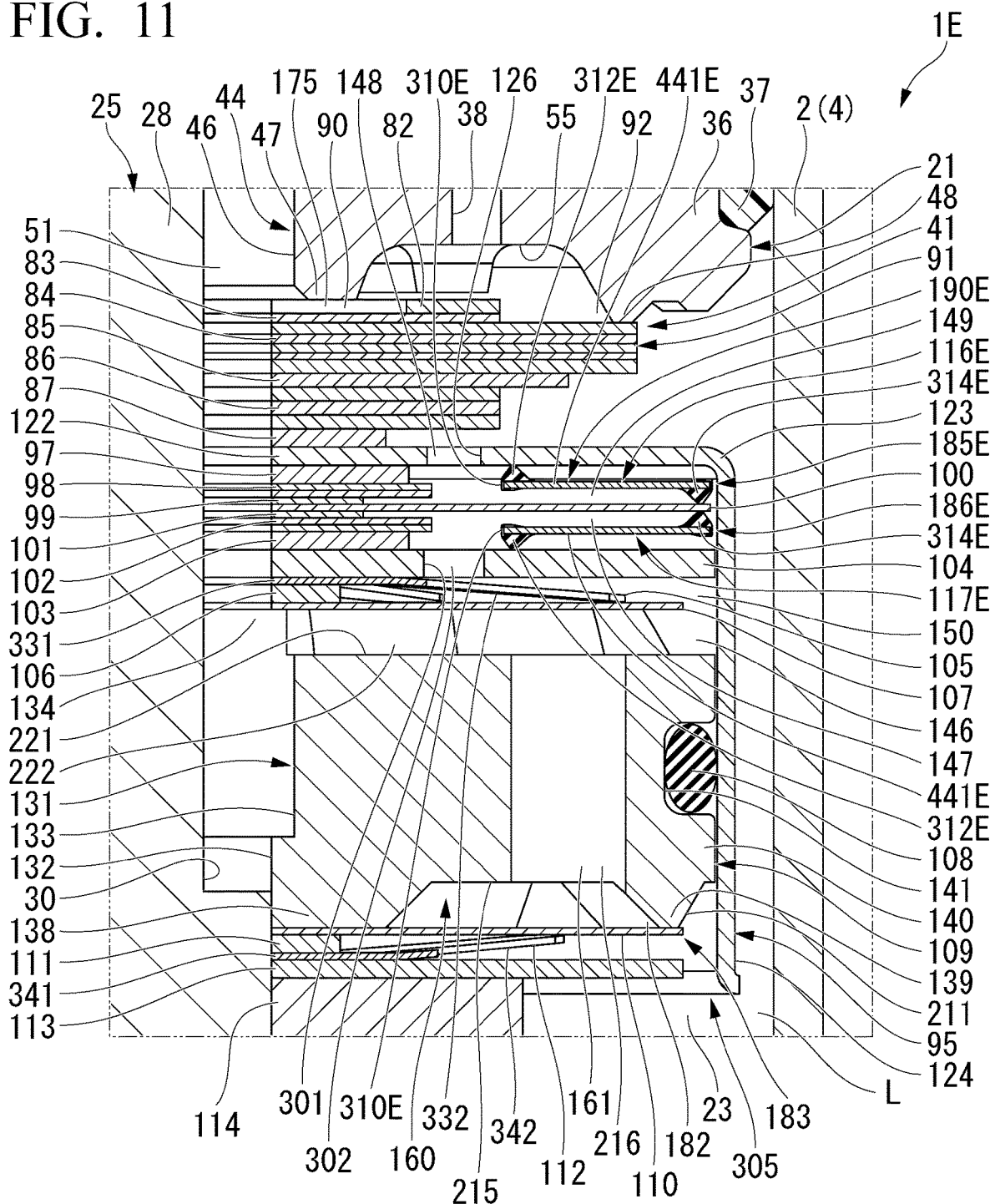
FIG. 11 is a partial cross-sectional view illustrating a main part of a shock absorber according to a sixth embodiment of the present invention.

In a shock absorber 1E of the sixth embodiment, as illustrated in FIG. 11, an accumulator 190E is provided in place of the accumulator 190 of the first embodiment.

The accumulator 190E includes a seal disc 116E (biasing member) having a bored disc shape provided on a radially outer side of discs 97 to 99 instead of the disc spring 116. The accumulator 190E includes a seal disc 117E (biasing member) having a bored disc shape provided on a radially outer side of discs 101 to 103 instead of the disc spring 117.

The seal disc 116E is provided between a bottom part 122 of a cap member main body 95 and a flexible disc 100. The seal disc 116E includes a base disc 441E having a bored disc shape made of a metal, an annular inner circumferential seal part 312E formed of a rubber material having a sealing property such as nitrile rubber or fluoro-rubber, and an annular outer circumferential seal part 314E formed of a rubber material having a sealing property such as nitrile rubber or fluoro-rubber.

The base disc 441E has a constant width in a radial direction over the entire circumference. The inner circumferential seal part 312E is fixed to an inner circumferential edge portion of the base disc 441E over the entire circumference and has an annular shape. A cross section of the inner circumferential seal part 312E in a plane including a central axis of the base disc 441E has a triangular shape that protrudes to one side in a thickness direction (axial direction) of the base disc 441E. An inner circumferential edge portion of the inner circumferential seal part 312E is an inner circumferential edge portion of the seal disc 116E, and a radially inner side of the inner circumferential seal part 312E is a hole 310E that penetrates the seal disc 116E in the axial direction. An inner diameter of the inner circumferential seal part 312E, that is, an inner diameter of the hole 310E, is larger than an outer diameter of the disc 98.

The outer circumferential seal part 314E is fixed to an outer circumferential edge portion of the base disc 441E over the entire circumference and has an annular shape. A cross section of the outer circumferential seal part 314E in a plane including the central axis of the base disc 441E has a triangular shape that protrudes to the other side in the thickness direction (axial direction) of the base disc 441E. That is, the inner circumferential seal part 312E and the outer circumferential seal part 314E have shapes that protrude in directions opposite to each other in the axial direction from the base disc 441E. An outer circumferential edge portion of the outer circumferential seal part 314E is an outer circumferential edge portion of the seal disc 116E. The seal disc 116E has an outer diameter slightly smaller than an inner diameter of a cylindrical part 124 of the cap member main body 95.

The seal disc 116E is directed such that the inner circumferential seal part 312E protrudes to the bottom part 122 side of the cap member main body 95 and the outer circumferential seal part 314E protrudes to the flexible disc 100 side from the base disc 441E. The seal disc 116E is in contact with the bottom part 122 at the inner circumferential seal part 312E. The inner circumferential seal part 312E is in contact with a position of the bottom part 122 on a radially outer side of all passage holes 126 of the bottom part 122 over the entire circumference. The seal disc 116E is in contact with the flexible disc 100 over the entire circumference at the outer circumferential seal part 314E.

A range of movement of the seal disc 116E in a radial direction of a piston rod is determined when the seal disc 116E comes into contact with the cylindrical part 124 of the cap member main body 95. In other words, in the radial direction of the piston rod 25, the seal disc 116E is slightly movable within an inner range of the cylindrical part 124 of the cap member main body 95 with respect to the cap member main body 95, the discs 97 to 99, and the flexible disc 100 which do not move. However, even if the seal disc 116E moves to the maximum in the radial direction, the seal disc 116E maintains a state in which the inner circumferential seal part 312E is in contact with a position of the bottom part 122 on a radially outer side of all the passage holes 126 of the bottom part 122 over the entire circumference and maintains a state in which the outer circumferential seal part 314E is in contact with the flexible disc 100 over the entire circumference. An outer circumferential end portion of the seal disc 116E comes into contact with the cylindrical part 124 of the cap member main body 95 that covers a valve seat member 109.

The seal disc 117E is provided between the flexible disc 100 and a spring contact disc 104. The seal disc 117E is a common part having the same shape as the seal disc 116E. The seal disc 117E is directed in a direction opposite to the seal disc 116E in the axial direction. The discs 101 to 103 are disposed on an inner side of the seal disc 117E in the radial direction with a gap with respect to an inner circumferential edge portion of disc spring 117E in the radial direction.

The seal disc 117E is directed such that the inner circumferential seal part 312E protrudes to the spring contact disc 104 side and the outer circumferential seal part 314E protrudes to the flexible disc 100 side from the base disc 441E. The seal disc 117E is in contact with the spring contact disc 104 at the inner circumferential seal part 312E. The inner circumferential seal part 312E of the seal disc 117E is in contact with a position of the bottom part 122 on a radially outer side of all passage holes 301 of the spring contact disc 104 over the entire circumference. The seal disc 117E is in contact with the flexible disc 100 over the entire circumference at the outer circumferential seal part 314E.

A range of movement of the seal disc 117E in the radial direction of the piston rod 25 is also determined when the seal disc 117E comes into contact with the cylindrical part 124 of the cap member main body 95. Even if the seal disc 117E moves to the maximum in the radial direction, the seal disc 117E maintains a state in which the inner circumferential seal part 312E is in contact with a position of the spring contact disc 104 on a radially outer side of all the passage holes 301 of the spring contact disc 104 over the entire circumference and maintains a state in which the outer circumferential seal part 314E is in contact with the flexible disc 100 over the entire circumference. An outer circumferential end portion of the seal disc 117E comes into contact with the cylindrical part 124 of the cap member main body 95 that covers the valve seat member 109.

A lower chamber communication chamber 149 is formed by being surrounded by the discs 97 to 99, the flexible disc 100, the seal disc 116E, and the bottom part 122 of the cap member main body 95. The flexible disc 100, the seal discs 116E and 117E, the discs 97 to 99, and the lower chamber communication chamber 149 constitute a lower chamber volume variable mechanism 185E capable of changing a volume of the lower chamber communication chamber 149.

An upper chamber communication chamber 147 is formed by being surrounded by the discs 101 to 103, the flexible disc 100, the seal disc 117E, and the spring contact disc 104. The flexible disc 100, the seal discs 116E and 117E, the discs 101 to 103, and the upper chamber communication chamber 147 constitute an upper chamber volume variable mechanism 186E capable of changing a volume of the upper chamber communication chamber 147.

In the shock absorber 1E of the sixth embodiment, in an extension stroke, the flexible disc 100 constituting the upper chamber volume variable mechanism 186E deforms a portion of the seal disc 116E on a radially inner side of a portion in contact with the outer circumferential seal part 314E toward the bottom part 122 side of the cap member main body 95 to increase a volume of the upper chamber communication chamber 147. Also, in a compression stroke, the flexible disc 100 constituting the lower chamber volume variable mechanism 185E deforms a portion of the seal disc 117E on a radially inner side of a portion in contact with the outer circumferential seal part 314E toward the spring contact disc 104 side to increase a volume of the lower chamber communication chamber 149. Thereby, the accumulator 190E operates in the same manner as the accumulator 190 in the first embodiment.

According to the shock absorber 1E of the sixth embodiment, the seal disc 116E is in contact with the flexible disc 100 at the outer circumferential seal part 314E made of a material with a high sealing property, and is in contact with the bottom part 122 of the cap member main body 95 at the inner circumferential seal part 312E made of a material with a high sealing property. Therefore, leakage of an oil fluid L from the lower chamber communication chamber 149 can be suppressed. Further, the seal disc 117E is in contact with the flexible disc 100 at the outer circumferential seal part 314E made of a material with a high sealing property, and is in contact with the spring contact disc 104 at the inner circumferential seal part 312E made of a material with a high sealing property. Therefore, leakage of the oil fluid L from the upper chamber communication chamber 147 can be suppressed. Therefore, damping force characteristics can be further stabilized.

Further, in the shock absorber 1 of the first embodiment illustrated in FIGS. 1 to 3, portions of the disc springs 116 and 117 in contact with the flexible disc 100 or portions of the flexible disc 100 in contact with the disc springs 116 and 117 may be coated with a sealing material. Also, in the first embodiment, a portion of the disc spring 116 in contact with the bottom part 122 of the cap member main body 95 or a portion of the bottom part 122 of the cap member main body 95 in contact with the disc spring 116 may be coated with a sealing material. Also, in the first embodiment, a portion of the disc spring 117 in contact with the spring contact disc 104 or a portion of the spring contact disc 104 in contact with the disc spring 117 may be coated with a sealing material.

In the shock absorber 1A of the second embodiment illustrated in FIG. 4, a portion of the disc spring 116 in contact with the flexible disc 100 or a portion of the flexible disc 100 in contact with the disc spring 116 may be coated with a sealing material. Also, in the second embodiment, a portion of the disc spring 116 in contact with the bottom part 122 of the cap member main body 95 or a portion of the bottom part 122 of the cap member main body 95 in contact with the disc spring 116 may be coated with a sealing material.

In the shock absorber 1B of the third embodiment illustrated in FIG. 5, portions of the disc springs 116 and 117 in contact with the flexible disc 100 or portions of the flexible disc 100 in contact with the disc springs 116 and 117 may be coated with a sealing material. Also, in the third embodiment, a portion of the disc spring 116 in contact with the planar disc 411B or a portion of the planar disc 411B in contact with the disc spring 116 may be coated with a sealing material. Also, in the third embodiment, a portion of the disc spring 117 in contact with the spring contact disc 104 or a portion of the spring contact disc 104 in contact with the disc spring 117 may be coated with a sealing material.

In the shock absorber 1C of the fourth embodiment illustrated in FIG. 7, portions of the disc springs 116 and 117 in contact with the flexible disc 100 or portions of the flexible disc 100 in contact with the disc springs 116 and 117 may be coated with a sealing material. Also, in the fourth embodiment, a portion of the disc spring 117 in contact with the spring contact disc 104 or a portion of the spring contact disc 104 in contact with the disc spring 117 may be coated with a sealing material.

In the shock absorber 1D of the fifth embodiment illustrated in FIG. 9, portions of the disc springs 116 and 117 in contact with the flexible disc 100 or portions of the flexible disc 100 in contact with the disc springs 116 and 117 may be coated with a sealing material. Also, in the fifth embodiment, a portion of the disc spring 116 in contact with the spring contact disc 104 or a portion of the spring contact disc 104 in contact with the disc spring 116 may be coated with a sealing material. Also, in the fifth embodiment, a portion of the disc spring 117 in contact with the bottom part 122 of the cap member main body 95 or a portion of the bottom part 122 of the cap member main body 95 in contact with the disc spring 117 may be coated with a sealing material.

Further, it is also possible to have a structure without the disc spring 117E when the same modification as the modification of the shock absorber 1A of the second embodiment with respect to the shock absorber 1 of the first embodiment can be performed for the shock absorber 1E of the sixth embodiment.

The first to sixth embodiments have described examples in which the present invention is used for a dual-tube type hydraulic shock absorber, but the present invention is not limited thereto, and the present invention may be used for a mono-tube type hydraulic shock absorber in which an outer tube is eliminated and a gas chamber is formed with a slidable partition body on a side of the lower chamber 23 opposite to the upper chamber 22 in the cylinder 4, or can be used for any shock absorber including a pressure control valve that uses a packing valve having a structure in which a seal member is provided in a disc.

According to a first aspect of the embodiment described above, a shock absorber includes a cylinder in which a working fluid is sealed, a piston provided to be slidable in the cylinder and partitioning the inside of the cylinder into two chambers, a piston rod connected to the piston and extending to the outside of the cylinder, a passage through which a working fluid flows from the chamber on an upstream side to the chamber on a downstream side in the cylinder due to movement of the piston, a first damping force generation mechanism provided in the passage formed in the piston to generate a damping force, and a second damping force generation mechanism disposed separately from the first damping force generation mechanism and provided in the piston rod. The second damping force generation mechanism includes a valve seat member, a sub-valve provided in the valve seat member, and a cap member covering one end side of the second damping force generation mechanism and at least a part of an outer circumference of the valve seat member. A communication passage which allows the inside and outside of the cap member to communicate is formed at one end side of the cap member. A biasing member provided so that one end surface side is in contact with an outer circumferential side of the cap member with respect to the communication passage, and a bendable flexible disc provided so that the other end surface side of the biasing member is in contact therewith are disposed. Thereby, generation of abnormal noise can be suppressed.

According to a second aspect, in the first aspect, the biasing member is provided on both one end surface side and the other end surface side of the flexible disc.

According to a third aspect, in the first or second aspect, the biasing member is formed of a plate-shaped disc spring which is formed so that an outer circumferential surface side is bent to be in contact with the flexible disc and an inner circumferential surface side is bent to be in contact with a bottom part of the cap member.

According to a fourth aspect, in any one of the first to third aspects, an outer circumferential end portion of the biasing member comes into contact with a cylindrical part of the cap member which covers the valve seat member.

According to a fifth aspect, in any one of the first to third aspects, a guide member provided between the biasing member and the flexible disc to be in contact with an inner circumferential side of the biasing member is provided.

According to a sixth aspect, in any one of the first to fifth aspects, the bottom part of the cap member includes a planar disc which is in contact with the biasing member.

INDUSTRIAL APPLICABILITY

According to the shock absorber described above, generation of abnormal noise can be suppressed.

REFERENCE SIGNS LIST 1, 1A to 1E Shock absorber
4 Cylinder
21 Piston
22 Upper chamber (chamber)
23 Lower chamber (chamber)
Piston rod
41, 42 First damping force generation mechanism
72, 92 First passage (passage)
95 Cap member
100 Flexible disc
104 Spring contact disc (bottom part)
107, 110 Sub-valve
109 Valve seat member
116, 117 Disc spring (biasing member)
116E, 117E Seal disc (biasing member)
122 Bottom part
124 Cylindrical part
148, 302 Communication passage
173, 183 Second damping force generation mechanism
411B, 411C Planar disc
431D, 432D Guide member

The invention claimed is:
1. A shock absorber comprising:
a cylinder in which a working fluid is sealed;
a piston provided to be slidable in the cylinder and partitioning an inside of the cylinder into two chambers;
a piston rod connected to the piston and extending to an outside of the cylinder;
a passage through which a working fluid flows from the chamber on an upstream side to the chamber on a downstream side in the cylinder due to movement of the piston;
a first damping force generation mechanism provided in the passage formed in the piston to generate a damping force; and
a second damping force generation mechanism disposed separately from the first damping force generation mechanism and provided in the piston rod, wherein
the second damping force generation mechanism includes:
a valve seat member;
a sub-valve provided in the valve seat member; and
a cap member covering one end side of the second damping force generation mechanism and at least a part of an outer circumference of the valve seat member, and
on one end side of the cap member,
a communication passage which allows the inside and outside of the cap member to communicate is formed, and a biasing member provided so that one end surface side is in contact with an outer circumferential side of the cap member with respect to the communication passage, and a bendable flexible disc provided so that the other end surface of the biasing member is in contact therewith are disposed.

2. The shock absorber according to claim 1, wherein the biasing member is provided on both one end surface side and another end surface side of the flexible disc.

3. The shock absorber according to claim 1, wherein the biasing member is formed of a plate-shaped disc spring which is formed so that an outer circumferential surface side is bent to be in contact with the flexible disc and an inner circumferential surface side is bent to be in contact with a bottom part of the cap member.

4. The shock absorber according to claim 1, wherein an outer circumferential end portion of the biasing member comes into contact with a cylindrical part of the cap member which covers the valve seat member.

5. The shock absorber according to claim 1, further comprising a guide member provided between the biasing member and the flexible disc to be in contact with an inner circumferential side of the biasing member.

6. The shock absorber according to claim 1, wherein the bottom part of the cap member includes a planar disc which is in contact with the biasing member.

\* \* \* \* \*